United States Patent
Presby

(10) Patent No.: US 7,713,414 B2
(45) Date of Patent: May 11, 2010

(54) METHOD FOR REMOVAL OF CONTAMINANTS FROM WATER

(75) Inventor: David W. Presby, P.O. Box 617, Sugar Hill, NH (US) 03585

(73) Assignee: David W. Presby, Sugar Hill, NH (US)

( * ) Notice: Subject to any disclaimer, the term of this patent is extended or adjusted under 35 U.S.C. 154(b) by 0 days.

(21) Appl. No.: 11/894,441

(22) Filed: Aug. 21, 2007

(65) Prior Publication Data
US 2008/0041784 A1   Feb. 21, 2008

Related U.S. Application Data

(62) Division of application No. 10/922,497, filed on Aug. 20, 2004, now Pat. No. 7,288,190.

(60) Provisional application No. 60/497,248, filed on Aug. 22, 2003, provisional application No. 60/507,926, filed on Oct. 1, 2003.

(51) Int. Cl.
*C02F 3/00*   (2006.01)
(52) U.S. Cl. .................... 210/605; 210/610; 210/630
(58) Field of Classification Search ................. 210/605, 210/610–611, 630
See application file for complete search history.

(56) References Cited

U.S. PATENT DOCUMENTS

| | | | |
|---|---|---|---|
| 5,429,752 A | 7/1995 | Presby | |
| 5,606,786 A | 3/1997 | Presby | |
| 5,954,451 A | 9/1999 | Presby | |
| 6,106,716 A * | 8/2000 | Berkman | 210/603 |
| 6,290,429 B1 | 9/2001 | Presby | |
| 6,461,078 B1 | 10/2002 | Presby | |
| 6,863,805 B1 * | 3/2005 | Barreras et al. | 210/143 |
| 7,144,509 B2 * | 12/2006 | Boyd et al. | 210/610 |

* cited by examiner

*Primary Examiner*—Chester T Barry
(74) *Attorney, Agent, or Firm*—Grossman Tucker Perreault & Pfleger PLLC

(57) ABSTRACT

Disclosed is a water de-contamination system, methods, and apparatus using alternating aerobic, anaerobic, and aerobic conditions, with carbon and other waste processing treatments, to remove contaminants from water. Included is an aerobic system in flow communication with an outlet from a waste tank; waste processing treatments in flow communication with liquid exiting the aerobic system and in which anaerobic conditions can be created; means for creating and maintaining anaerobic conditions either within the waste processing treatments or after fluid exits the waste processing treatments; means for return of the fluid into aerobic conditions. A fluid retaining device within which anaerobic conditions are maintained and nitrogen-containing compounds and other contaminants are processed and removed is used. Waste processing treatments are provided within or adjacent the fluid retaining device. Included are outflow means for fluid to exit the fluid retaining device and enter aerobic conditions for final processing and release.

12 Claims, 36 Drawing Sheets

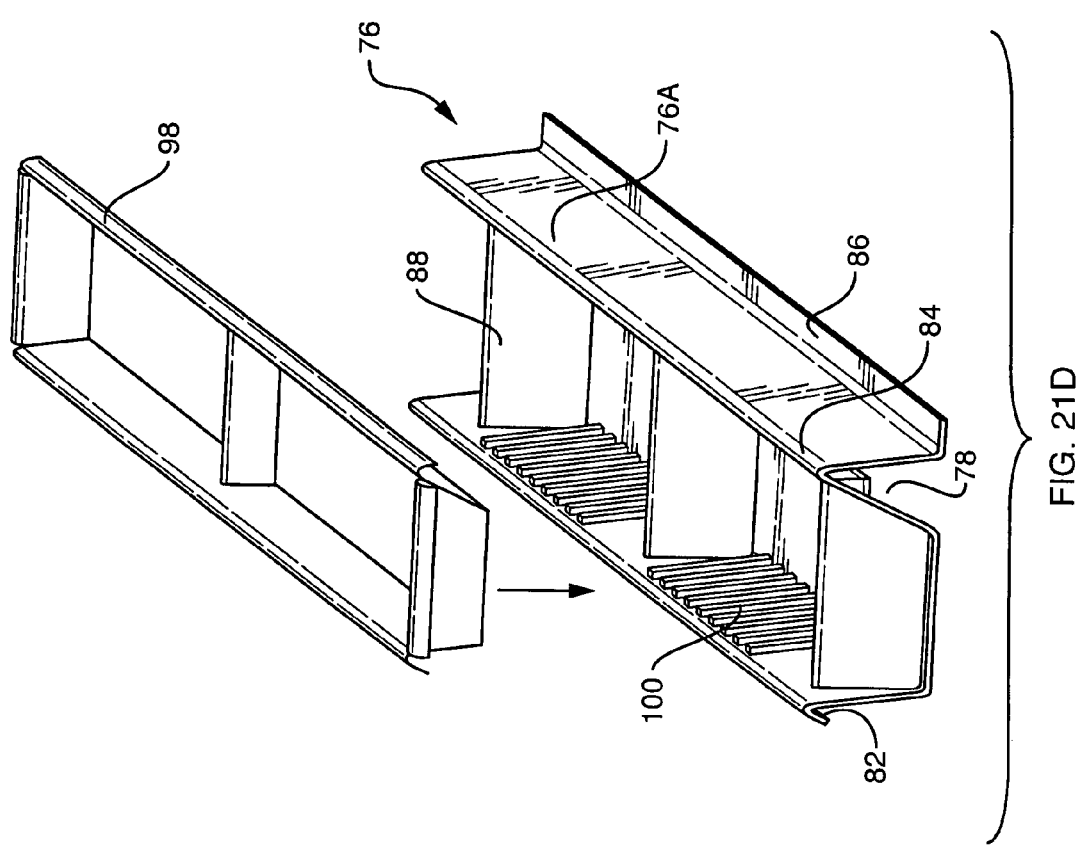

EXAMPLE 1

| Parameters for Analysis | Units | Point 1 ADN | Point 2 DN1 | Point 3 DN2 | Point 4 DN3 | Point 5 DN4 |
|---|---|---|---|---|---|---|
| MES | mg/L | | <1 | <1 | <1 | <1 |
| DBO5 C | mg/L | <2 | <2 | <2 | <2 | <2 |
| DBO5 C sol. | mg/L | <2 | <2 | <2 | <2 | <2 |
| DCO totals | mg/L | 35 | 40 | 35 | 23 | 35 |
| DCO sol | mg/L | 12 | <3 | 12 | 12 | 6 |
| NTK | mg N/L | <0.9 | <0.5 | <0.9 | <0.9 | <0.9 |
| NH4 | mg N/L | <0.5 | <0.5 | <0.5 | <0.5 | <0.5 |
| NO2 | mg/L | <0.05 | <0.05 | <0.05 | <0.05 | <0.05 |
| NO3 | mg/L | 39 | 7.6 | 3.1 | 5.6 | 5.1 |
| NO2-NO3 | mg/L | 39 | 7.6 | 3.1 | 5.6 | 5.1 |
| P total | mg P/L | 1.1 | <0.3 | <0.3 | <0.3 | <0.3 |
| Fecal Coliform | UFC 100 mL | 10 | <10 | <10 | <10 | <10 |
| F.C. Filtered | UFC 100 mL | | | | | |
| Sample Number | | 622,383 | 622,386 | 622,385 | 622,384 | 622,382 |
| Type of Levy Preparation | | C.M. | C.M. | C.M. | C.M. | C.M. |

C.M.-Composition Manual
C.A.-Composition Automatic

FIG. 29

EXAMPLE 2

| Parameters for Analysis | Units | Point 1 ADN | Point 2 DN1 | Point 3 DN2 | Point 4 DN3 | Point 5 DN4 |
|---|---|---|---|---|---|---|
| MES | mg/L | 2 | <1 | 2 | <1 | <1 |
| DB05 C | mg/L | <2 | <2 | <2 | <2 | <2 |
| DBO5 C sol. | mg/L | <2 | <2 | <2 | <2 | <2 |
| DCO totals | mg/L | 6 | 6 | <3 | 12 | 6 |
| DCO sol. | mg/L | <3 | <3 | <3 | <3 | <3 |
| NTK | mg N/L | <0.9 | <0.9 | <0.9 | <0.9 | <0.9 |
| NH4 | mg N/L | <0.5 | <0.5 | <0.5 | <0.5 | <0.5 |
| NO2 | mg/L | <0.05 | <0.05 | <0.05 | <0.05 | <0.05 |
| NO3 | mg/L | 26 | 0.51 | 0.3 | 0.59 | 0.69 |
| NO2-NO3 | mg/L | 26 | 0.51 | 0.3 | 0.59 | 0.69 |
| P total | mg P/L | 1.2 | <0.3 | 0.4 | <0.3 | <0.3 |
| Fecal Coliform | UFC 100 mL | <10 | <10 | <10 | <10 | <10 |
| F.C. Filtered | UFC 100 mL | | | | | |
| Sample Number | | 629,820 | 629,823 | 629,824 | 629,822 | 629,821 |
| Type of Levy Preparation | | C.M. | C.M. | C.M. | C.M. | C.M. |

C.M.-Composition Manual
C.A.-Composition Automatic

FIG. 30

METHOD FOR REMOVAL OF CONTAMINANTS FROM WATER

RELATED APPLICATIONS

This application is a Divisional Application of application Ser. No. 10/922,497, filed Aug. 20, 2004, now U.S. Pat. No. 7,288,190. This application claims priority under 35 USC 0 120 to prior U.S. Provisional Application No. 60/497,248 to the same Applicant, filed Aug. 22, 2003, titled Method, Apparatus and System for Removal of Nitrogen Compounds from Leaching Systems. This application also claims priority under 35 USC 0 120 to U.S. Provisional Application No. 60/507,926 to the same Applicant, filed Oct. 1, 2003, titled Method, Apparatus and System for Removal of Nitrogen Compounds from Leaching Systems.

GOVERNMENT GRANTS/SUPPORT

None

BACKGROUND AND FIELD OF THE INVENTION

The invention relates to systems for processing liquid waste, particularly septic or leaching system waste. More particularly the invention relates to methods, apparatuses and systems for removing nitrogen-containing and other compounds such as phosphorus and suspended solids from waste water such as that in septic systems. The system includes, in part, a process of alternating aerobic, anaerobic, and aerobic conditions, with the addition of carbon, waste processing treatments and a fluid retaining means, eliminates nitrogen compounds such as ammonia, nitrates and nitrites, as well as other materials, from septic system waste as it is processed. Thus, the present invention effectively and efficiently processes contaminated waste water.

DESCRIPTION OF RELATED ART

Suspended solids have plagued the septic system and waste water industry more in the last 15 or more years that in previous years. The increase in the problem is due in part to the evolution and development of some of the modern day cleaners that now make cleaning easier in that they cause grease and oil to dissolve into the cleaning water. The problem this causes with the septic tank is that the now-suspended solids, in passing through the tank, neither cool nor make contact at a slow enough pace to separate from the water. Thus, the suspended solids proceed through the system and are not removed, eventually causing clogging or other problems.

Lint and fuzz has also been an on-going problem for the septic tank to control. This material stays suspended in the septic tank liquid and normally passes through, remaining suspended in the effluent which subsequently also causes problems in the leach system connected with the septic tank.

In addition, there has always been a problem with removing harmful nitrogen containing compounds from the septic tank effluent. When the effluent leaves the septic tank and enters the leaching apparatus high concentrations of ammonia, organic nitrogen compounds and other harmful nitrogen compounds such as nitrates and nitrites are present in the liquid. To date, there is no effective way to remove these compounds. They are eventually just diluted via the leaching system and dispersed into the soil.

Septic systems available to date do not effectively provide for the removal, in a manner which does not effect the cost and performance characteristics of the septic treatment system, of suspended solids, lint, fuzz, organic and human waste, and nitrogen containing compounds that are typically found in septic tank liquid. This is partly because of the solids, lint, fuzz, nitrogen containing compounds and the like, which result in too high a BOD (bacterial oxygen demand) for the bacteria present to fully break down and digest the waste material, too high a COD (chemical oxygen demand) for any added chemicals to react with and break down the waste material and, simply too high an amount of total suspended solids present. So far there has been no way to fully and effectively overcome these increasing problems.

It is important that the amount of suspended solids that leave the treatment tank be minimal so as not to adversely affect the subsequent treatment of the waste water/effluent. A leach field, for example, is adversely effected by suspended solids because the suspended solids will clog the receiving layer and also adversely affect the absorption characteristics of the leach bed. The same is true for lint and fuzz. However, Applicant has developed and patented several devices and methods for removing suspended solids, lint and fuzz from septic systems, including unique drainage/treatment conduit, unique treatments and devices for use with drainage/treatment conduit, and various more efficient and effective layouts for septic systems. Such devices and methods can be found in Applicants U.S. Pat. No. 6,461,078 for a unique conduit, U.S. Pat. No. 5,606,786 for a unique conduit, U.S. Pat. No. 5,954,451 for a multi-layer leaching/treatment material, U.S. Pat. No. 6,290,429 for a multi-level leaching system, and U.S. Pat. No. 5,429,752 for a septic tank maze system, all of which are incorporated herein by reference in their entirety.

However, to date there is still no effective way to remove the harmful nitrogen containing compounds from septic effluent/waste water. These compounds, such as ammonia, and various nitrates and nitrites are harmful to people, animals and the environment, and must simply be diluted and dispersed eventually in to the soil in concentrations low enough not to cause harm and to eventually be further diluted and dispersed by and in the soil. Although others have tried, including using carbon, the methods developed to date cannot effectively remove nitrogen containing compounds even when carbon is used.

Thus, it would be desirable and advantageous to have a waste water treatment system that includes means for removing harmful nitrogen containing compounds from effluent/leachate in addition to removing other materials such as phosphorus, E. coli, and suspended solids. The results of such a method, apparatus or system would be much cleaner effluent/leachate that would not be harmful to people, animals or the environment and which could be released freely into the soil and the atmosphere. It would be even more desirable to have a waste water treatment system that could convert harmful nitrogen containing compounds into at least harmless if not even beneficial nitrogen compounds such as nitrogen gas that could be released into the soil and air while reducing the volume or amount of waste material released into the soil and produce much cleaner water released back into the soil. It would also be desirable to have such a system that would not significantly increase the cost of a septic or waste treatment system, and would not increase the land area needed for processing of waste. It would also be desirable if such a method, apparatus or system could be easily installed, integrated and incorporated into the variety of currently-existing septic and other waste water treatment systems such that existing systems could be up graded or customized to specific uses or needs without having to be completely replaced. There is nothing currently available which satisfies these needs. However, the present invention disclosed below provides these needed advantages, uses and features.

SUMMARY OF THE INVENTION

The invention provides methods, apparatuses and systems for removing nitrogen-containing compounds and other materials, compounds, and contaminants from contaminated water such as from leaching and septic systems. The present invention provides a waste treatment system that includes means for removing harmful compounds from effluent/leachate. The results of the methods, apparatuses and systems of the invention include much cleaner effluent/leachate water that is not harmful to people, animals or the environment and which can be released freely into the soil and the atmosphere, or collected for further purification for drinking water, collected for irrigation and the like. The waste treatment system of the present invention converts harmful nitrogen-containing compounds and other contaminants into harmless compounds such as nitrogen gas that can be released into the soil and air while reducing the volume or amount of waste material released into the soil and providing very clean water for release back into the soil. The invention does not significantly increase the cost of a septic or waste treatment systems, and does not increase the land area needed for processing of waste. In fact, the present invention provides additional processing and cleaning of septic effluent in the same space or area used for a conventional septic system, or in even less area than used for conventional systems. Thus, the present invention increases the usefulness, efficiency and effectiveness of septic systems, while reducing release or emission of harmful compounds, especially nitrogen-containing compounds.

In a most basic embodiment the invention comprises a waste treatment system that, by a process of alternating aerobic, anaerobic, and aerobic conditions, with the addition of carbon and other waste processing treatments, and a fluid retaining device, eliminates contaminants including nitrogen compounds such as ammonia, nitrates and nitrites from septic system waste as it is processed. While described, for ease of reference, with respect to nitrogen-containing compounds, the present invention removes many additional compounds and materials from leachate. In one embodiment, a waste conduit from a waste source in flow communication with a septic tank is in flow communication with at least one leaching system under aerobic conditions; there is a carbon source and/or other waste processing treatments provided adjacent the at least one leaching system; there are means for creating and maintaining anaerobic conditions; wherein said means for creating and maintaining anaerobic conditions is connected in flow communication with a means for again creating aerobic conditions. The carbon source adds carbon to the first leachate. The carbon then reacts with the nitrogen containing compounds such as nitrates and nitrites under the anaerobic and second aerobic conditions to convert the nitrogen compounds to nitrogen gas, water, carbon dioxide and the like. The devices and methods of the means for creating and maintaining anaerobic conditions ensure the anaerobic processing of the waste water and the removal of essentially all contaminants.

In a different embodiment the invention includes a tray or mat type structure within which anaerobic conditions are maintained for processing of nitrogen-containing and other compounds, materials and contaminants. A carbon source is included either within the tray or mat structure or prior to leachate entering the tray or mat structure. The waste system can also have various treatments applied thereto at various points on the process including chemicals and microbes. The leachate enters the tray or mat structure in the presence of a carbon source, or after having passed through a carbon source, and is then maintained in an anaerobic state until the leachate level reaches an outflow level at which point the leachate moves out of the tray or mat structure and into aerobic conditions. The carbon and/or microbes present reacts with the nitrogen containing compounds such as nitrates and nitrites under the aerobic, anaerobic and second aerobic conditions to convert the nitrogen compounds to nitrogen gas, water, carbon dioxide and the like.

An advantage of the invention is that because the system can be laid out in a number of ways, including on a slope, using one or more leaching systems, using multi-level drainage field layout, using various types of drainage/treatment conduit, and using various chemical and/or microbe treatments, the system can provide greater leaching volume in a given surface area than conventional systems and can take advantage of gravity and the slope of the land to aid in the leaching process. In addition, the nitrogen removing capability of the invention results in much cleaner, less harmful final effluent, and less volume or amount of final effluent because some of the materials and compounds that would stay in the water and/or soil if using a conventional septic system are converted to gaseous material that can vent harmlessly into the soil and air.

Another advantage of the invention is that it may be used to treat a variety of liquid waste, including, but not limited to, septic tank effluent, strong waste water having high BOD (bacterial oxygen demand—i.e. high demand on the bacteria present that are digesting the waste material), high COD (chemical oxygen demand) and suspended solids concentrations, oil contaminated water, and chemically contaminated water. The contaminated fluid is more thoroughly and completely processed by the present invention than is possible with conventional systems and can be used for example for irrigation, water recycling or further purification such as chlorination for drinking water. Thus, again while described for example for the removal of nitrogen-containing compounds the invention works very well to process and eliminate many other contaminants of waste water and thus should not be limited to nitrogen removal.

The method, apparatus and system of the invention can be easily installed, integrated and incorporated into the variety of currently-existing septic and waste treatment systems such that existing systems can be up-graded or customized to specific uses or needs, without having to be completely replaced or renovated. For example, various types of drainage/treatment conduit may be used, including, for septic purposes, any graveless system such as the SB2, Enviro-Septic®, and GEO-FLOW® brands of leaching conduit. In addition, the invention can be used with septic systems including conventional pipe and stone systems, chamber systems, and ELJEN IND-RAIN® system. Also, high bacterial concentration can be used and maintained within the system. The high concentration of bacteria in the small system area possible using the present invention permits installation of small area leaching systems in small spaces where conventional septic systems could not be installed.

These and further advantages of the present invention will become apparent to those skilled in the art to which this invention pertains and after a study of the description of the invention, drawings, and the appended claims.

BRIEF DESCRIPTION OF THE DRAWINGS

FIGS. 21A-E are perspective views showing a cap structure that fits over a tray structure, side corrugations to provide space between the tray structure and the cap structure, and the flow of effluent up along the corrugations and out the open tops of the corrugations into the space created by the dividing means for flow to soil, sand or the like.

FIG. 29 is example data wherein known quantities of compounds were run through the system of the invention under various conditions/embodiments of the invention.

FIG. 30 is a second set of example data showing how various known compounds are removed by the system of the invention in various configurations.

DETAILED DESCRIPTION OF THE INVENTION

Figure 1:
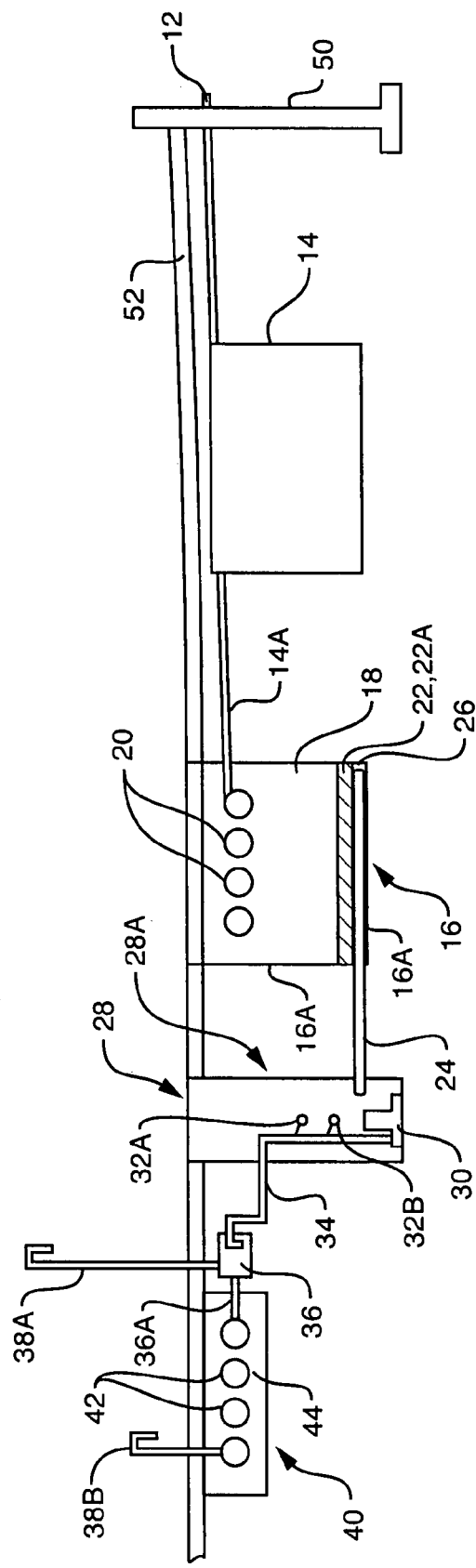
FIG. 1 is a side view of an embodiment of the system and apparatus of the present invention with a pump to a vented second aerobic leaching system.

The following is a description of the preferred embodiment of the invention. It is clear that there may be variations in the size and the shape of the system, in the materials used in the construction and in the orientation of the various parts and devices of the system. However, the main features are consistent and the particular objectives, features and advantages are as disclosed herein.

A most basic embodiment of the invention is a system for removing nitrogen and other compounds from waste fluid such as leachate comprising: a waste introduction conduit in flow communication with a septic or other waste disposal, storage or treatment tank; an aerobic condition leaching system in flow communication, via the waste introduction conduit, with the outlet from the waste tank; a carbon source in which anaerobic/anoxic conditions can be created; means for creating and maintaining anaerobic conditions and means for exit from the carbon source material and anaerobic conditions into aerobic or anaerobic conditions and eventually again to aerobic conditions. Under the anaerobic conditions and final aerobic conditions carbon and bacteria/microbes react with nitrogen-containing and other compounds in the waste material to produce nitrogen gas, water, and other harmless compounds.

The carbon source provides carbon for reaction with the common nitrogen-containing and other compounds found in septic waste such as ammonia, and various nitrates and nitrites. Once the carbon is combined with the waste, anaerobic conditions are created either in the carbon source or after and the mixture is then kept under anaerobic conditions until transferred to second aerobic conditions wherein outside air can enter, thus allowing the carbon and bacteria to further react with the nitrogen compounds to produce non-harmful nitrogen gas, water, and carbon dioxide, thus removing the harmful and toxic nitrogen containing compounds. An important aspect of the invention is that there be alternating aerobic, anaerobic and again aerobic conditions at some point in the system as a whole. The anaerobic conditions can be created in the carbon source if desired, or at a later stage after introduction of carbon, such as in a sump. If anaerobic conditions are to be created in the carbon source, the composition of the carbon source need be such that the leachate is retained long enough and passes through slowly enough to become anoxic or anaerobic. Thus, the method, apparatus and system of the present invention more completely processes waste, particularly liquid septic waste and result in much cleaner final effluent than is possible with current septic waste systems. The resulting nitrogen and other gas is eventually released into the atmosphere and the final effluent is thus much cleaner than possible with conventional systems. The removal of the contaminants by the present invention is possible due to the aerobic, anaerobic, aerobic alternating conditions of the present invention.

Generally septic systems have microbes such as, for example, bacteria present in them that digest or break down some of the waste materials present. Due to a septic system leach field generally lying in a bed of porous material, generally the conditions within a leach field are aerobic. Oxygen flows in through the soil and reaches the microbes, bacteria and waste in the leaching system. However, when certain microbes such as for example bacteria are placed in anaerobic conditions where oxygen is not available, they change to a different means to stay alive and digest and break down waste materials in a different manner than when oxygen is present. Thus, having both aerobic and anaerobic conditions in a septic system can lead to greater breakdown of waste materials.

Therefore, with the present invention, digestion of waste material by microbes and bacteria begins in the aerobic leaching conduit. While microbes such as bacteria are present to some degree in all waste material, the microbes may also be augmented or extra bacteria can be added to the system to aid in digestion of waste. In the first aerobic phase of the invention a majority of the ammonia and organic nitrogen compounds are removed. However, the leachate at that point contains high levels of harmful nitrates and nitrites that conventional septic systems cannot remove to a significant extent. When the leachate enters the carbon source of the present invention, carbon is picked up in the leachate mixture of microbes, chemicals, and partially treated waste. When anaerobic conditions are created, either in the carbon source or after the leachate passes through the carbon source, additional anaerobic digestions and processes occur. Finally, when the leachate reaches the second aerobic phase, microbes and bacteria further break down the waste materials and the carbon continues to react with the nitrates and nitrites to form, among other products from other processes and reactions, nitrogen gas, water and carbon dioxide, thus resulting in a very clean, very pure effluent that can be used for things such as for example irrigation, chlorination for drinking water and the like. Note also, that additional bacteria or other supplemental materials, chemicals or compounds can be added to any leaching system of the present invention at any location or time during functioning of the system, as desired or needed depending on the waste being treated.

Figure 2:
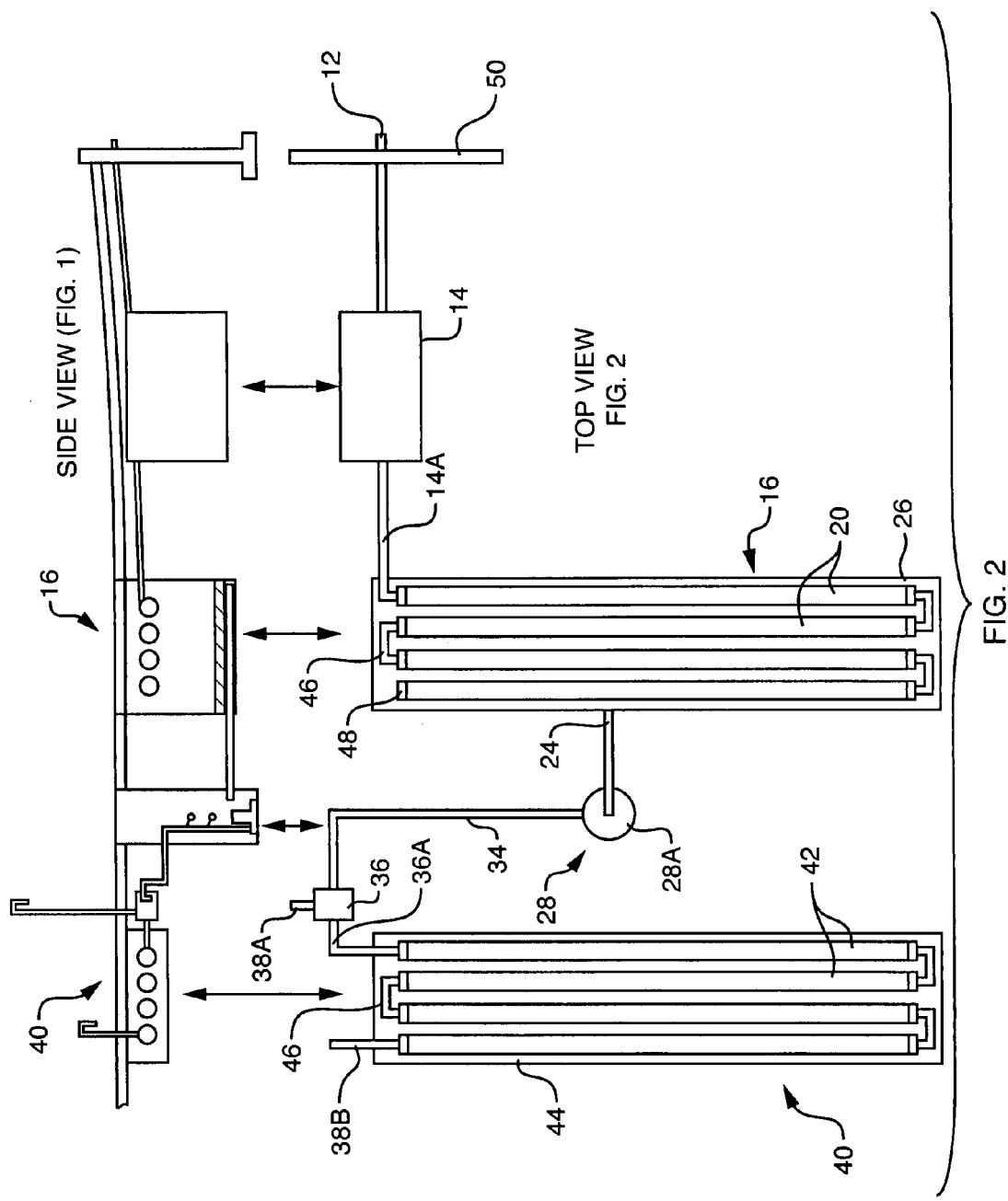
FIG. 2 is a top view of the embodiment shown in FIG. 1, with a small view of FIG. 1 above to show the correspondence of system components.

Referring now to the Figures, within which like reference numerals refer to like elements throughout, FIG. 1 is a side schematic view of one embodiment of the invention. FIG. 2 is simply a top view of the embodiment shown in FIG. 1. Waste and waste water enters initially through inlet line 12. For example, inlet line 12 exits a house or other building from the foundation wall 50. Inlet line 12 can connect in flow communication to, for example, septic or other waste storage or treatment tank 14. The waste then exits tank 14 via tank exit conduit 14A wherein the waste enters the system of this embodiment, comprising a first leaching system or field 16. A septic line and septic tank supply waste but are not part of the present invention. First leaching system 16, by way only of non-limiting example shown herein, may be surrounded on at least two sides by a liquid-impermeable enclosure or membrane 16A, and contains a drainage and treatment conduit system 20 such as Applicant's Enviro-Septic® conduits surrounded by porous drainage material 18 such as for example sand, broken glass, plastic fibers, ground-up plastic, gravel, slag, ash and the like. Liquid-impermeable membrane 16A can be formed from any suitable liquid-impermeable material such as, but not limited to, plastic, rubber, soil, cement, metal, foil and the like.

Within the enclosure formed by membrane 16A and below porous drainage material 18 is a layer of carbon source material 22 such as for example wood, wood chips, sawdust, leaves, wood shavings, grass, hay, mulch, straw, composting materials, fiberboard, pressed board, cardboard, newspaper, charcoal, and the like and combinations thereof, below which, and still within the enclosure formed by membrane 16A, is a first leaching system exit conduit 24. In addition, the carbon source could also be carbon source 22 (wood, leaves etc.) mixed with silt, silty sands or other retaining material 22A with high capillary action that retains or slows water, to form a mixed carbon source. Thus, in all embodiments, the carbon source can be carbon source 22 and/or a mixture of carbon source 22 and retaining silty or other dense material 22A, as long as the carbon source is dense enough, there can be any mix as long as it can retain or slow the water/leachate long enough for carbon to be picked up and begin reacting with the leachate. Depending on the carbon source's density and composition anaerobic conditions can be created within the carbon source. The carbon source may, but does not necessarily have to create the anaerobic conditions.

Because first leaching system 16 is covered on top by topsoil 52, thus exposing first leaching system 16 to ambient air through topsoil 52, the conditions within the bed of porous drainage material 18 and conduit system 20 are aerobic. However, the conditions inside the carbon source material 22 and/or 22A can become anaerobic due to the slow flow and long retention of the leachate as it passes through carbon source material 22 and/or 22A. In this embodiment, membrane 16A encloses first leaching system 16 on three sides, including enclosing the first end of the exit conduit 24. Thus, in this embodiment, when the leachate leaves first leaching system 16, mixed with carbon, it can be in an anaerobic state.

According to the method of the invention, and shown in FIGS. 1 and 2, waste enters first leaching system 16 within the enclosure formed by membrane 16A via tank exit conduit 14A and proceeds into drainage/treatment conduit 20 wherein the waste flows through the conduit members and is treated, filtered, broken down and separated depending on the type of conduit and treatment used. As shown in FIG. 2, the conduit members of drainage/treatment conduit 20 are connected in flow communication by raised connection devices 46, and the final conduit member is capped with end cap 48. As the waste material flows though drainage/treatment conduit 20 treated waste material gradually exits drainage conduit 20, for example through perforations in the walls of drainage/treatment conduit 20, and moves downward through porous drainage material 18 and into and through carbon source material 22 or 22A where the conditions can become anaerobic and the leachate eventually enters first leaching system exit conduit 24 which can be resting in a bed of a small amount of porous drainage material 26.

In the particular embodiment shown in FIGS. 1 and 2, the waste/carbon mixture then travels through exit conduit 24 into sump system 28 in sump or manhole 28A. Within sump 28A is a pump 30 connected in flow communication to a pressure line 34 having floats 32A and 32B thereon. Sump 28A is filled with liquid, the level of which is regulated by floats 32A and 32B. When the liquid reaches a level enough to elevate float 32A (lower float 32B would also already by elevated by that time), pump 30 is turned on. Once enough liquid is pumped out float 32A falls, then float 32B falls and turns pump 30 off. Thus, float 32A turns pump 30 on and float 32B turns pump 30 off according to the liquid level, thus maintaining a given liquid level range within sump system 28 at all times. Thus, in this particular example, the waste/carbon mixture, if under anaerobic conditions from passing through carbon source 22 and/or 22 mixed with 22A, enters sump 28A below the liquid level is thereby kept under anaerobic conditions, wherein the mixture is not exposed to ambient air. If the waste/carbon mixture is not under anaerobic conditions when it arrives in the sump system anaerobic conditions can be created by keeping the liquid level above the leachate conduit 24 and keeping the leachate under liquid. When pumped out, the waste/carbon mixture is pumped up to a distribution box 36 through pressure line 34. Distribution box 36 essentially regulates or controls the flow of material from pump 30 into a second leaching phase, here leaching system 40 such that when pump 30 turns on, second leaching system 40 does not receive a large "blast" of material all at once.

In addition, the liquid level in the sump can be varied depending on the design of the sump and what use is needed from the sump. The level of liquid and the location of the sump can be above or below (as in this case) the level of the exit conduit 24 from the first leaching system.

Distribution box 36 is also connected to a venting apparatus 38A through which gas, such as nitrogen gas exits the system. Venting apparatus 38A essentially functions as a chimney to vent exiting gas and draw a draft on second leaching system 40. Such a venting apparatus can be of any suitable length depending on the local conditions such as climate, snow depth, local soil conditions, etc. Waste/carbon mixture exits distribution box 36 and enters second leaching system 40 via distribution box exit conduit 36A. Second leaching system 40 comprises drainage/treatment conduit system 42 which can be the same type of drainage/treatment conduit as that used in first leaching system 16, such as for example Applicant's Enviro-Septic® conduit, in a bed of porous drainage material 44 which may also be the same types of materials used in first leaching system 16, such as for example sand, broken glass, plastic fibers, ground up plastic, pea stone, gravel, slag, ash and the like. Extending from the most "downstream" drainage/treatment conduit member 42 can be a second venting apparatus 38B which serves as an intake device mechanism. Intake venting apparatus 38B is generally shorter in overall length than first venting apparatus 38A, such that they function together to draw air in intake vent 38B and vent gas out vent 38A. However, the exact lengths of the vents above the finished ground level grade will vary depending on the needs of the system, the climate, soil conditions, slope of the land, and the like. Generally there can be a difference in height between the venting apparatus 38A and 38B in the general range of about ten (10) feet, but again, this difference is only an example and the actual lengths and length difference will depend on the system used, the location, the climate and the like. Thus, first venting apparatus 38A, as it is venting out exiting gas, draws a draft on second leaching system 40 as the gaseous nitrogen and other gasses exit first venting apparatus 38A, thus causing ambient air to be drawn into second leaching system 40 via second, intake venting apparatus 38B. In addition, while the draft drawn by the ambient air and the gas produced by the digestion process may be sufficient to vent and aerate the system, if needed venting apparatus 38A and/or 38B could have wind driven or motor driven fans installed thereon (not shown but understandable by one of ordinary skill in the art) to push and/or pull more air through the venting system.

Figure 10:
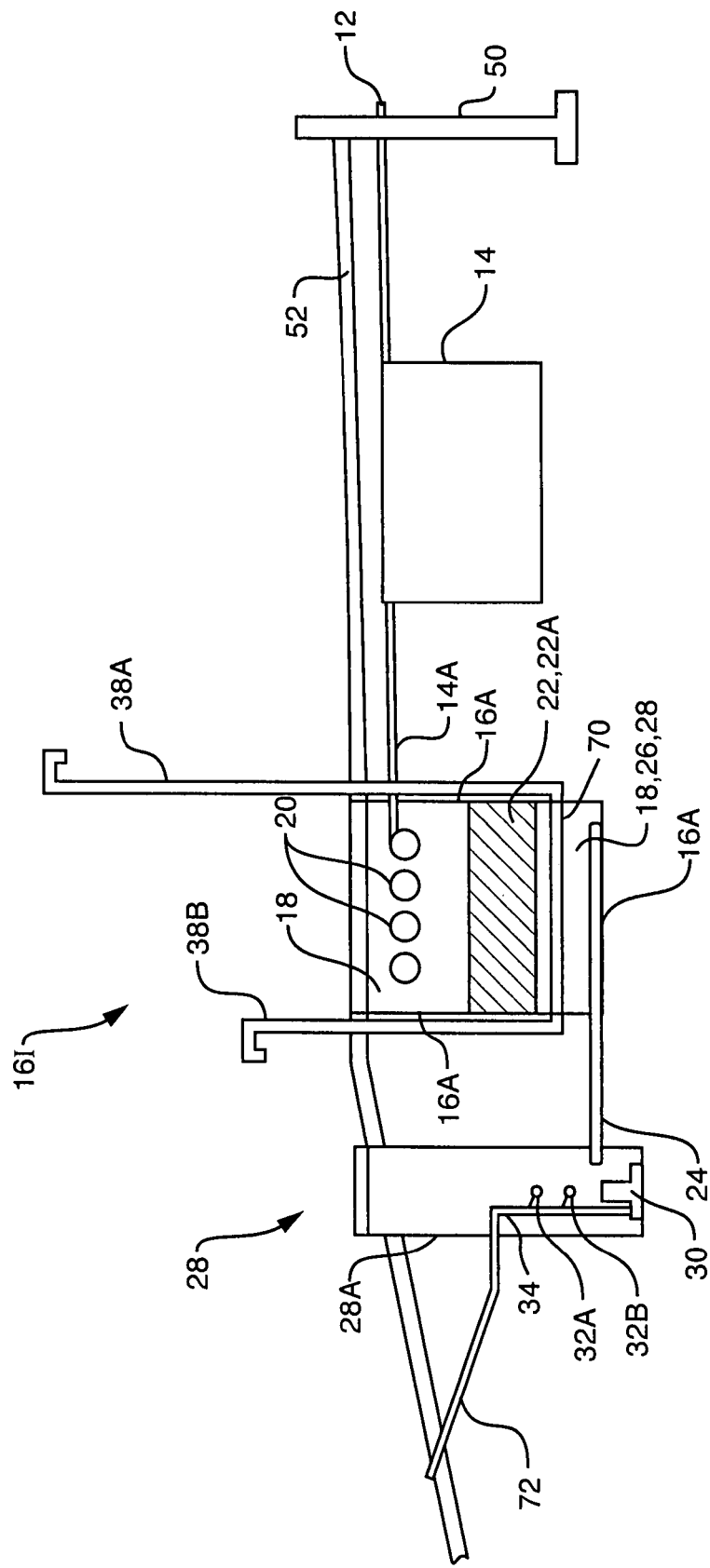
FIG. 10 is a side view showing an embodiment using a single leaching system with intake and exit vents, but wherein the effluent is collected into a drainage pipe, deposited in a sump, and pumped up to be discharged onto the surface of the land.
Figure 11:
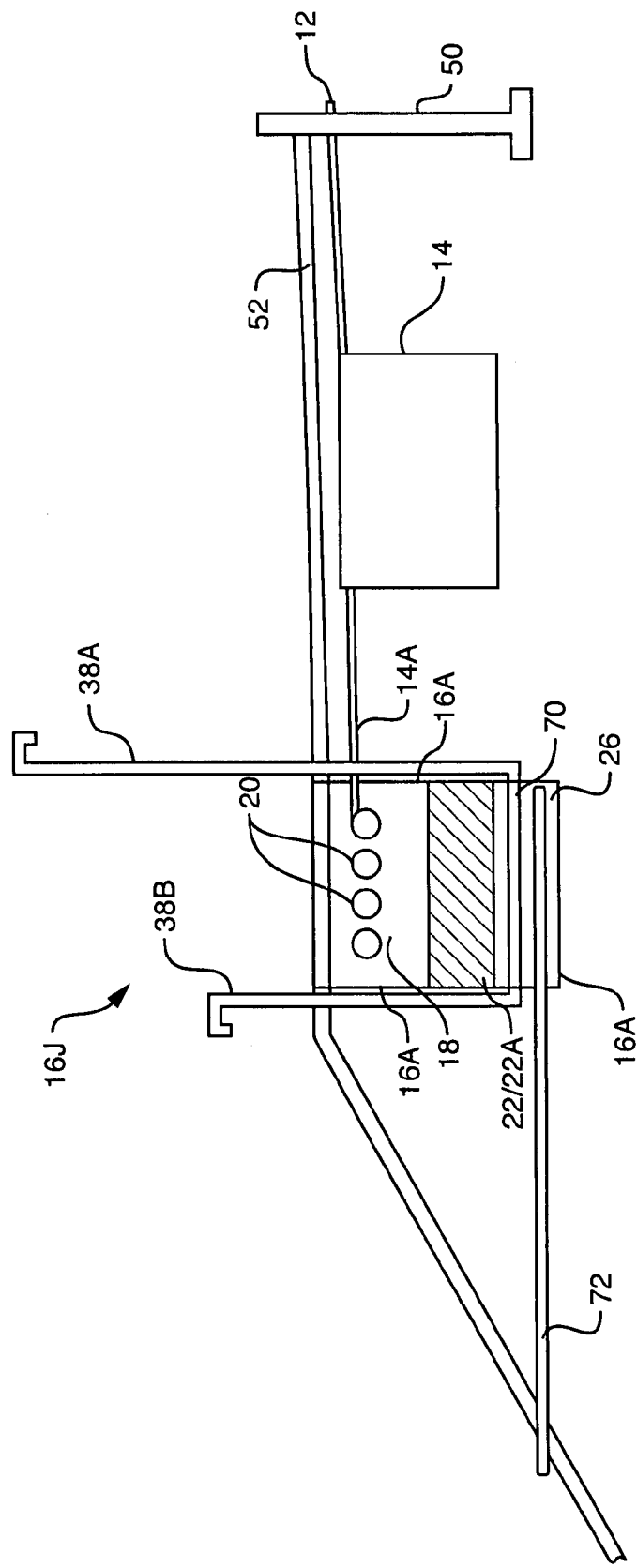
FIG. 11 is a side view showing an embodiment using a single leaching system with intake and exit vents, but wherein the effluent is collected into a drainage pipe and deposited onto the surface of the land downhill from the leaching system.

In addition, in this particular embodiment, second leaching system 40 is not contained within any sort of enclosure. It is simply located in the ground, in a bed of porous drainage material 44, and covered with topsoil 52. Thus, if the soil is porous enough, there may be no need for a second, intake venting apparatus such as venting apparatus 38B. With porous soil, enough air may be able to be drawn into second leaching system 40 through the soil. There may also be an exit conduit (as shown in FIGS. 10 and 11) that drains liquid into the ground from the end of the most "downstream" drainage/treatment conduit member 42. In the alternative, there need not be an exit conduit for any of the embodiments described herein. The final effluent or leachate can disperse directly into the soil if the soil type is suitable.

Figure 3:
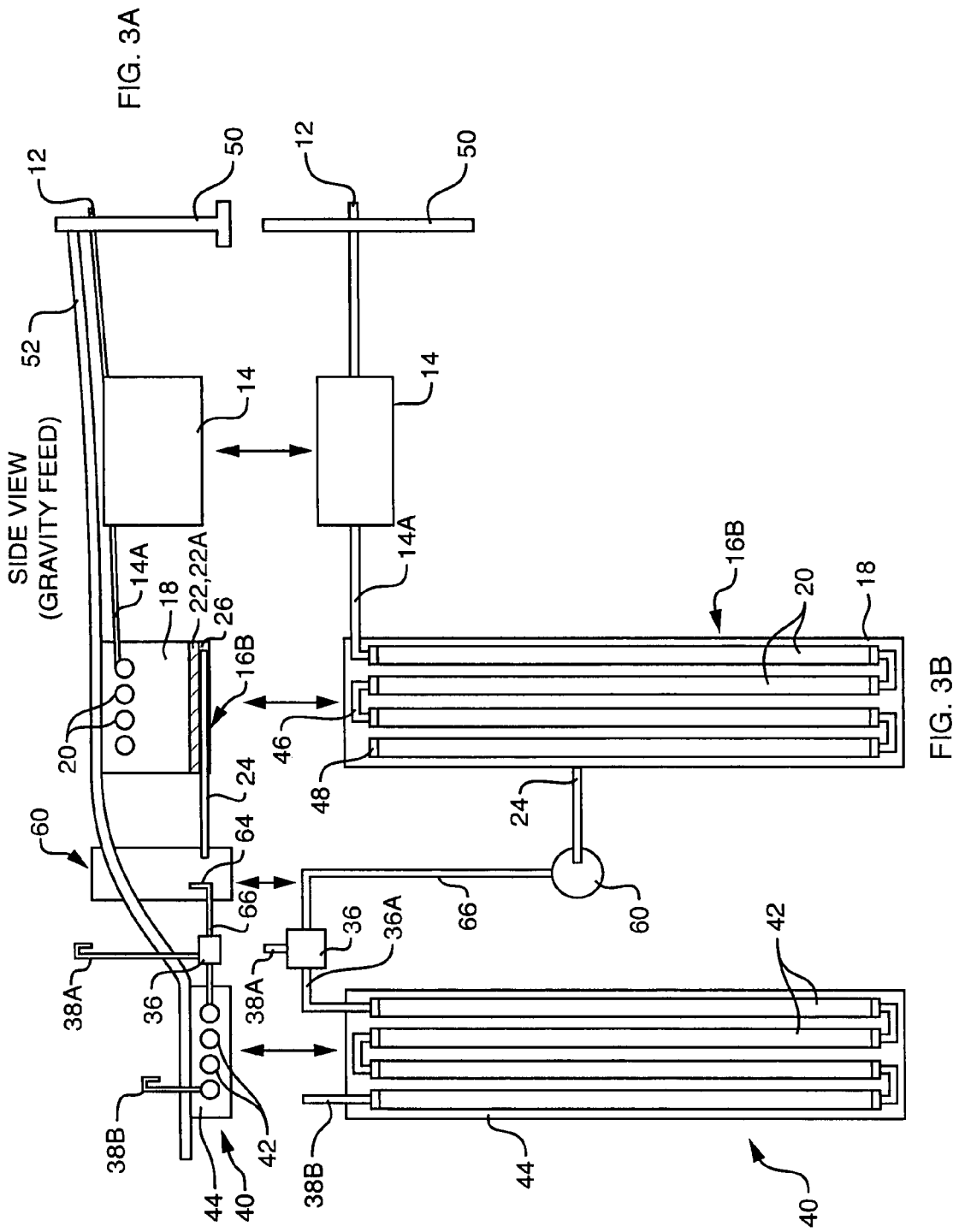
FIG. 3A is a side view of an embodiment of a system designed to use a gravity feed to a second leaching system, rather than a pump.
FIG. 3B is a top view of the gravity feed embodiment.

FIGS. 3A and 3B illustrate a second embodiment of the invention, still using two leaching systems, but rather than having to pump liquid from a sump, a gravity feed is used from first leaching system 16B. The inlet from the liquid source, toilet etc. would generally be the same, and the first leaching system can be the same. A carbon source 22, 22A and/or a mixture of the two can be used. However, instead of a sump system with a pump, there is a gravity sump or manhole 60 with a liquid elevation control device 64 therein which regulates the amount of material transferred from the sump system to distribution box 36 via gravity feed line 66. FIG. 3A is the side view of this alternative embodiment having a gravity sump mechanism, and FIG. 3B is the top view.

Figure 4:
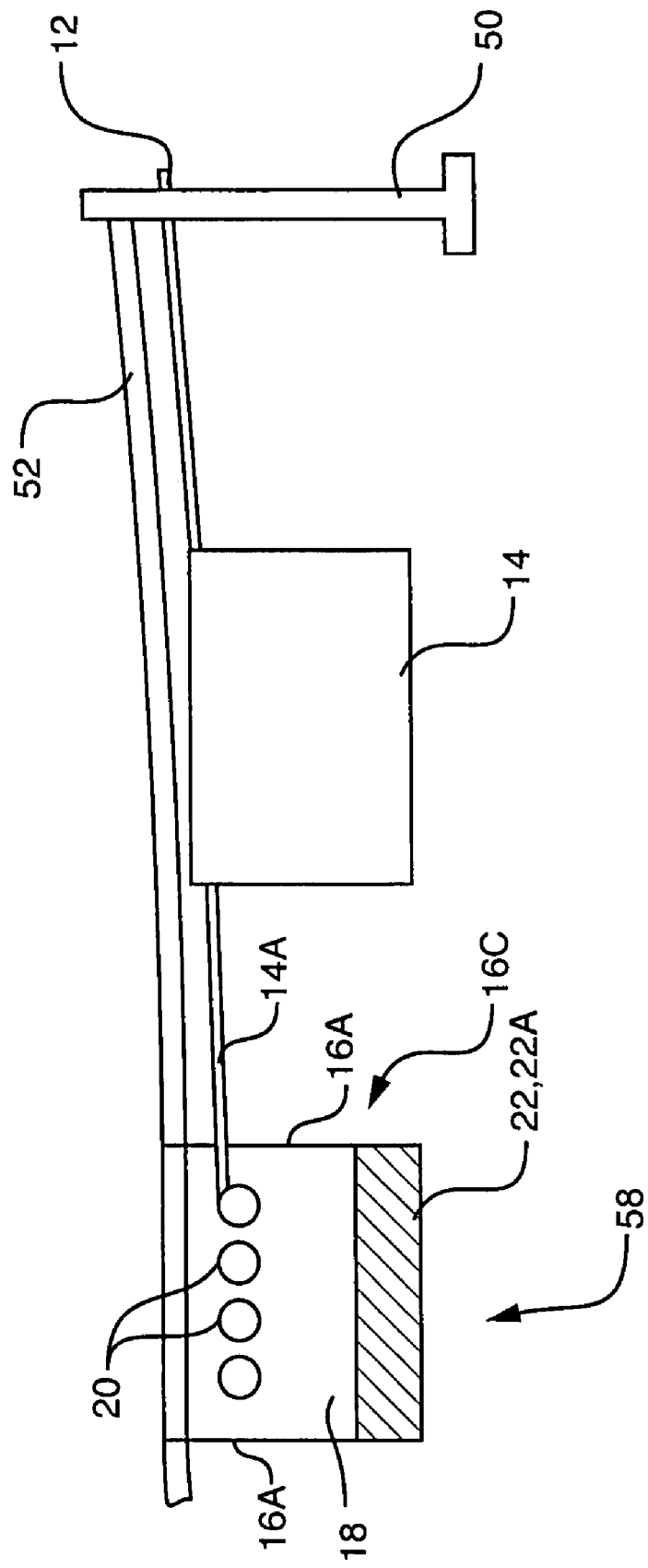
FIG. 4 is a side view of an embodiment using only one leaching system.

FIG. 4 illustrates another embodiment of the invention in which only one leaching system is used and the aerobic, anaerobic, and second aerobic conditions are all created within the one leaching system. This embodiment is shown with an example conduit 12 from a house, exiting at foundation wall 50, which empties into septic tank 14. The entire system is covered with topsoil 52. From tank 14, material enters tank exit conduit 14A and enters single leaching system 16C. In this embodiment, leaching system 16C comprises septic/drainage conduit 20 in a bed or layer of porous drainage material 18, covered on top with topsoil 52. Extending down along the sides of the bed of porous drainage material 18 is liquid-impermeable membrane/retaining material 16A enclosing the sides, but not the bottom, of the bed of porous drainage material 18. Below porous drainage material 18 is a layer of carbon source, either carbon source 22 comprised of wood, wood chips, sawdust, leaves, shavings, hay, grass, straw, mulch, composting material, fiberboard, pressed board, cardboard, newspaper, charcoal, and the like, and/or carbon source 22A which can be silt, silty sands or other restraining material with high capillary action that holds water, or a mixture of 22 and 22A. The bottom of the layer of carbon source material is open to the ground as illustrated by numeral 58, and is not enclosed. In addition, and for any of the embodiments of the invention, the layer of carbon source material can vary in thickness or depth depending on the embodiment being used, the soil type in which the entire system is installed, the slope of the land if any, and the like. Likewise, the various beds or layers of porous drainage material 18, 44 can be of any desired or needed thickness or depth as well. In addition, the carbon source, and any of the embodiments of the invention can be used in combination with a tray or cell type structure shown and described below in FIGS. 15-26.

When waste material enters leaching system 16A it is under aerobic conditions as it passes through and leaves drainage/treatment conduit 20 and passes into the layer or bed of porous drainage material 18. When the partially treated waste liquid containing various harmful nitrogen compounds enters the layer of carbon source 22 and/or 22A, the carbon source material 22 and/or 22A can retain the partially treated waste liquid long enough and slowly enough to create anaerobic conditions under which anaerobic digestion/breakdown processes occur. Eventually the waste liquid, now with carbon added, will pass through the carbon source layer and into the ground or additional fill where it again will encounter aerobic conditions in the soil under which aerobic conditions the carbon, microbes, and/or bacteria present will continue to react with the nitrogen containing compounds such that they will be converted to nitrogen gas which can safely exit the soil.

Figure 5:
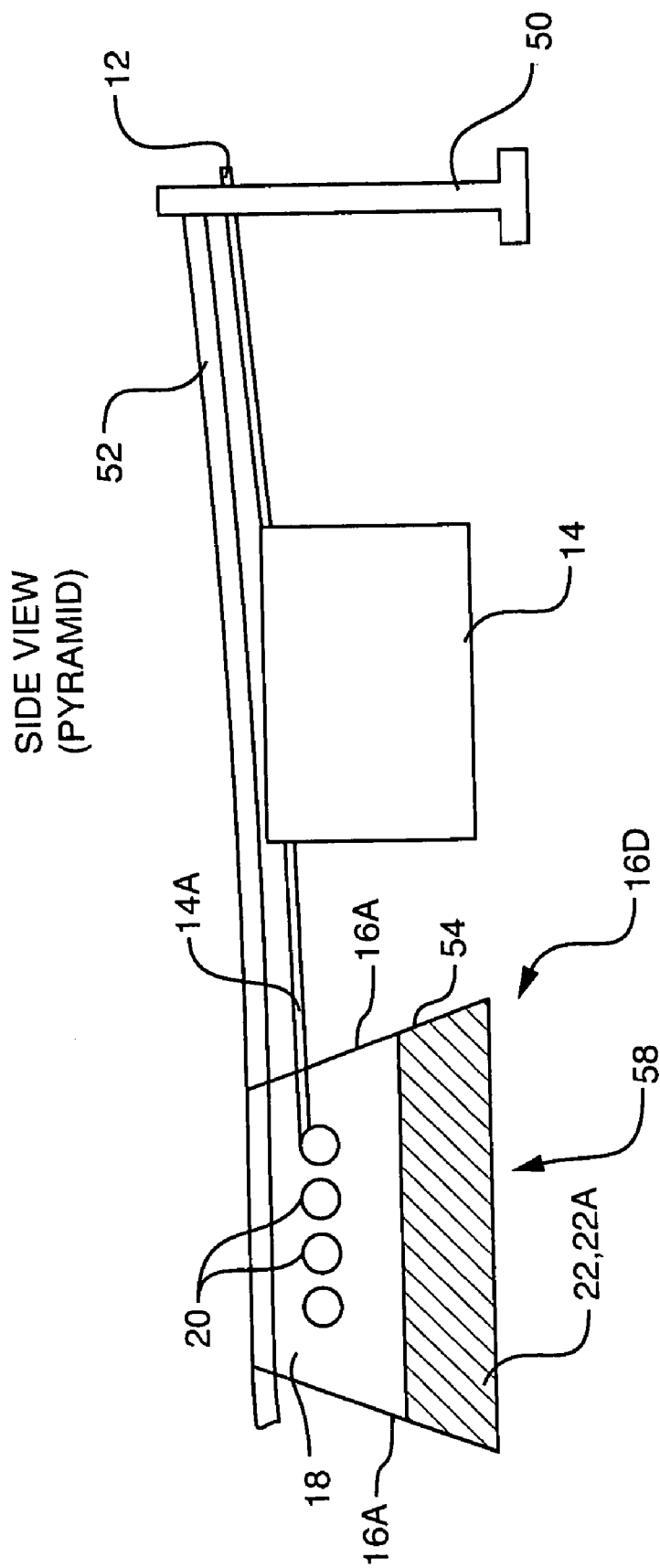
FIG. 5 is a side view of an embodiment using a single leaching system, but having a pyramid base.

FIG. 5 shows yet another possible embodiment of the invention. This particular embodiment is similar to that shown in FIG. 4, in that a single leaching system is all that is required. However, in this embodiment, rather than having a rectangular or cylindrical shape to the leaching system a pyramid shaped base 54 to leaching system 16D may be used. Such a pyramid system may be used to provide greater surface area against original soils existing at the site, for example if the original soil present at the site is not very porous, and additional drainage area exposure is desired.

Figure 6:
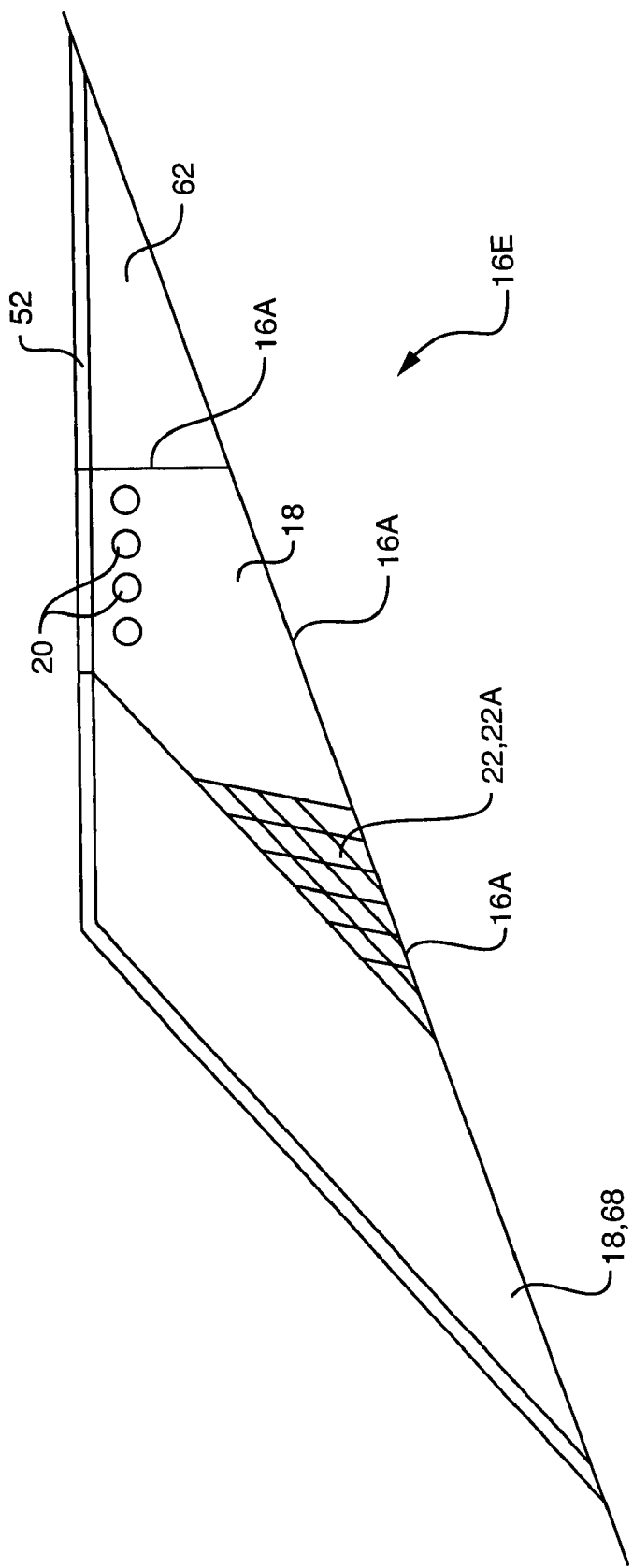
FIG. 6 is a side view showing an embodiment using a single leaching system, and built into a slope, with the drainage/treatment conduit level.

FIG. 6 shows another embodiment of a system using only one leaching system 16E, wherein the whole system is designed into the slope of the land. Note that drainage/treatment conduit system 20 has its members level and does not follow the slope of the land in this particular embodiment. Again, the entire system is covered with topsoil 52. In this FIG. 6, however, for ease of explanation, and to avoid redundancy, the house foundation, and inlet line have been omitted. Fill 62 is used to level the system into the hill, and the inlet line 12 would run through fill 62 if it were shown. Leaching system 16E of this embodiment is open to the ground on the downhill side, because waste material is directed to move downhill and exits the bed or layer of porous drainage material 18 to and along the downhill side, rather than strictly downward out the bottom as shown in previous embodiments. Thus, the uphill side and the entire bottom of the bed or layer of porous drainage material 18 can be, and are in this example, enclosed by membrane/sealing material 16A to ensure that the waste material moves through porous drainage material 18 in a downhill direction, rather than straight down into the soil. The carbon source material 22 and/or 22A is located down hill adjacent the downhill side of the bed or layer of porous drainage material 18. Because of the hill, carbon source 22 and/or 22A can be present essentially as a vertical dividing wall type structure along the "downstream" side (the side away from the entrance of the flow of waste into the system of the invention) of the bed of porous drainage material 18 contained by membrane 16A which encloses the bed of porous drainage material 18 on two sides—the uphill and bottom sides. The top of the whole system is covered with topsoil 52, and the bottom and "upstream" sides of the bed have membrane material 16A as a border. In addition, the bottom of the carbon source 22 and/or 22A is bounded by membrane 16A, again to ensure the waste material flows through the carbon source, not straight down into the ground. The "downstream" border of the leaching system 16E is the "wall" of carbon source material 22 and/or 22A. Thus, flow of effluent or leachate would necessarily be directed only through the "wall" of carbon source material 22 and/or 22A within which anaerobic conditions can result. The effluent or leachate carbon mixture is then directed for further processing. Once the partially treated waste liquid exits the carbon source layer, and enters fill or gravel or other porous material 18 and/or 68 the conditions again become aerobic, and the final conversion of harmful nitrogen compounds to nitrogen gas occurs.

Figure 7:
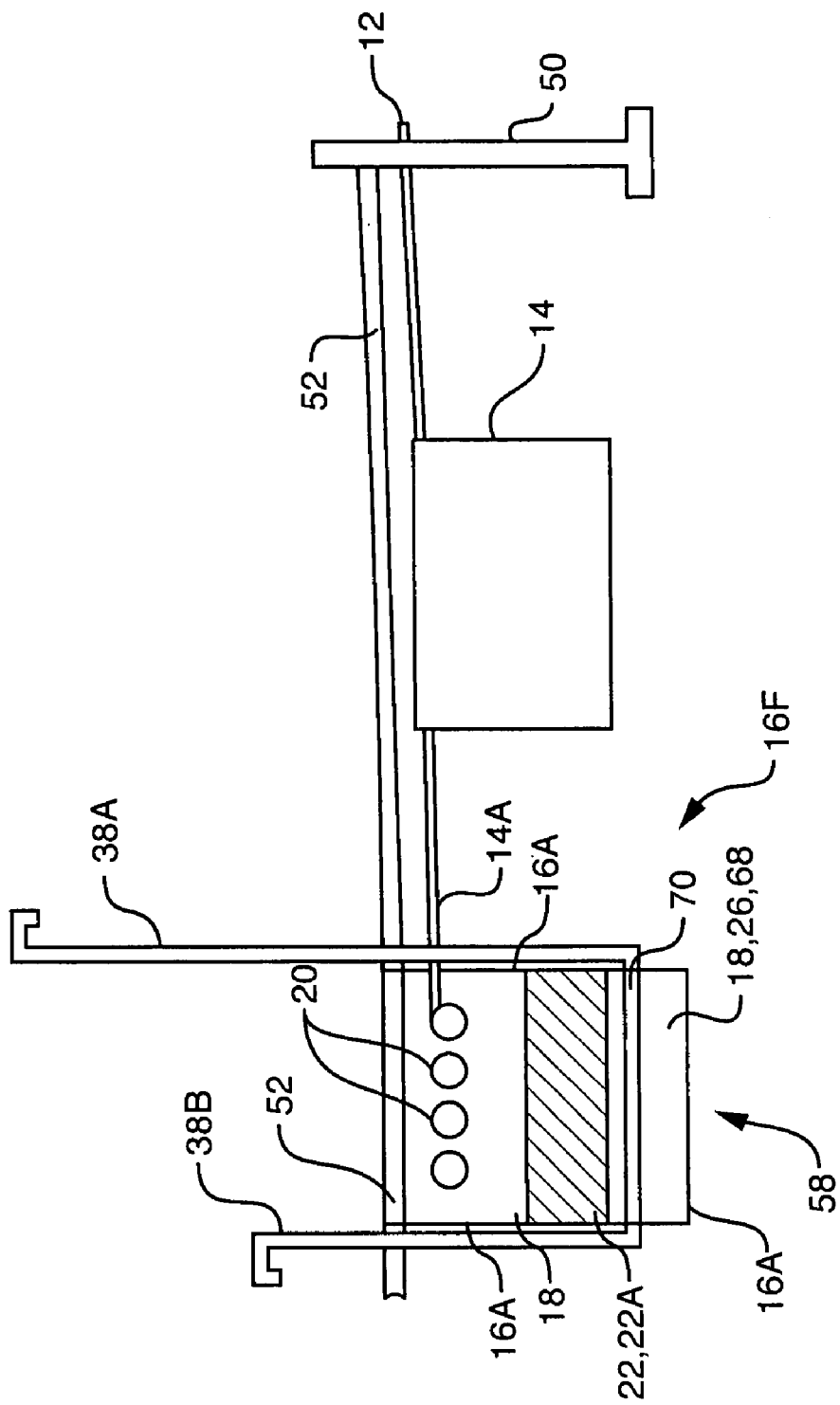
FIG. 7 is a side view showing an embodiment using a single leaching system, and intake and exit vents.

FIG. 7 illustrates another possible embodiment using a single leaching system 16F. As usual, but not part of the invention, inlet line 12 enters tank 14 from foundation 50. The entire system is covered with topsoil 52. However, in this case, a venting system can be added to the single leaching system if desired. Tank exit conduit 14A enters drainage/treatment conduit system 20 which lies in a bed of porous drainage material 18. Below bed of porous drainage material 18 is a layer of carbon source 22 and/or 22A. In this embodiment, below the layer of carbon source material 22 and/or 22A is a bed of porous drainage material 18 and/or course porous fill 68. Within the second or lower bed of porous material 18 and/or course porous fill 68 is a porous or perforated conduit 70 which connects first exit venting apparatus 38A to shorter intake venting apparatus 38B. The entire sides of leaching system 16F are enclosed by liquid-impermeable membrane 16A. The top, which is covered with topsoil 52 is open to the air, and the bottom of the second porous layer (18 and/or 68) is open to the soil below. With this embodiment, the leachate exiting the carbon source layer 22 and/or 22A enters the second porous material 18 and/or 68 and eventually flows into perforated conduit 70. In the second porous material 18 and/or 68 aerobic conditions again result due to venting apparatus 38A and 38B which draws-air in and vents gasses including nitrogen gas out. Thus, as the leachate moves through the second layer of porous material 18 and/or 68 and again encounters aerobic conditions due to venting apparatus 38A and 38B, the final reactions with the nitrogen containing compounds occur to form, among other reaction products, nitrogen gas which is vented out through shorter venting apparatus 38B, and water simply drains into the soil below.

Figure 8:
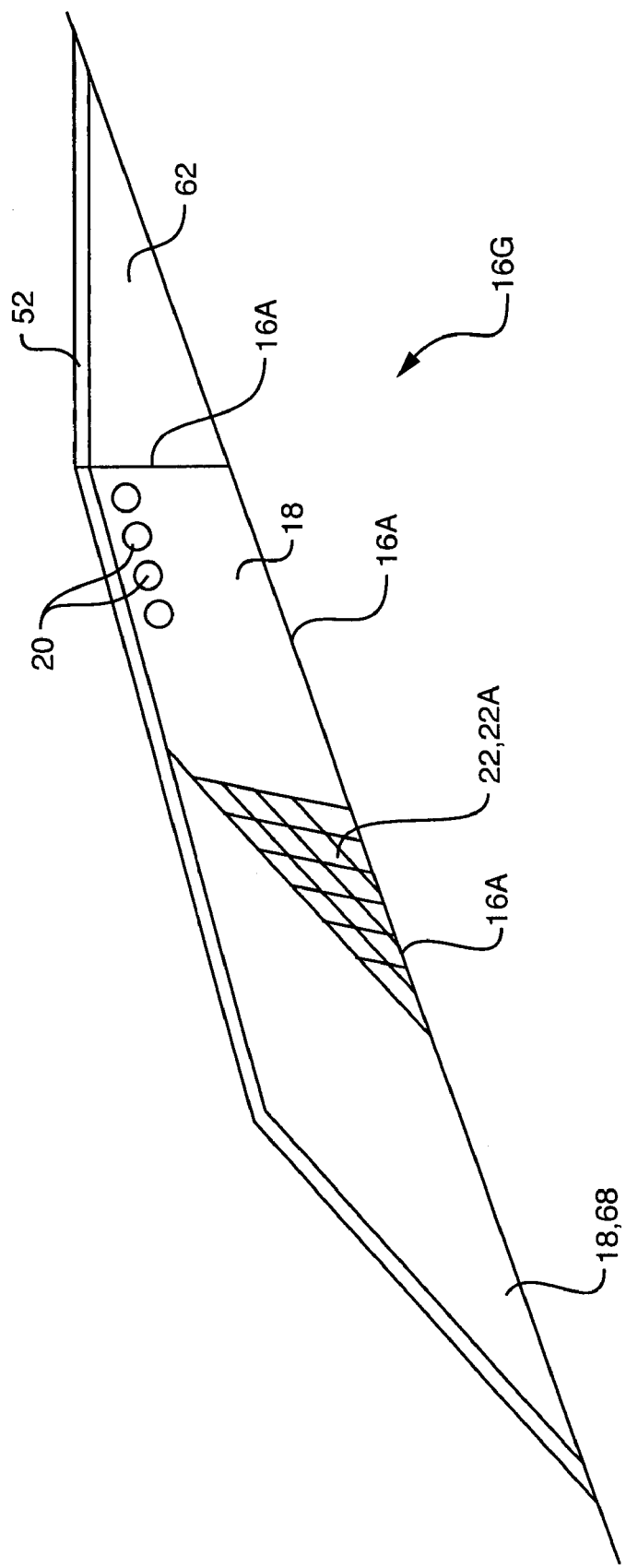
FIG. 8 is a side view showing an embodiment built into a slope, with the drainage/treatment laid out following the slope of the land, and having the carbon source to the downhill side of the leaching system, rather than below it in the ground.

FIG. 8 illustrates another embodiment built into the slope of the land and using a single leaching system 16G. Again, an initial waste introduction inlet 12 and foundation 50 are not shown. To level the surface of the system fill 62 may be used to carry and cover inlet 12. Note in this embodiment, the conduit members of drainage/treatment conduit 20 are not level as shown in FIG. 6, but are laid following the slope of the land. Membrane 16A lies along the uphill side of leaching system 16F, and all the way across the bottom of both the bed of porous material 18 and the carbon source layer 22 and/or 22A. Thus, the leachate is forced through the "wall" of carbon source 22 and/or 22A and into porous material 18 and/or 68 within which aerobic conditions again result and the nitrogen gas produced simply escapes through the porous material and the topsoil.

Figure 9:
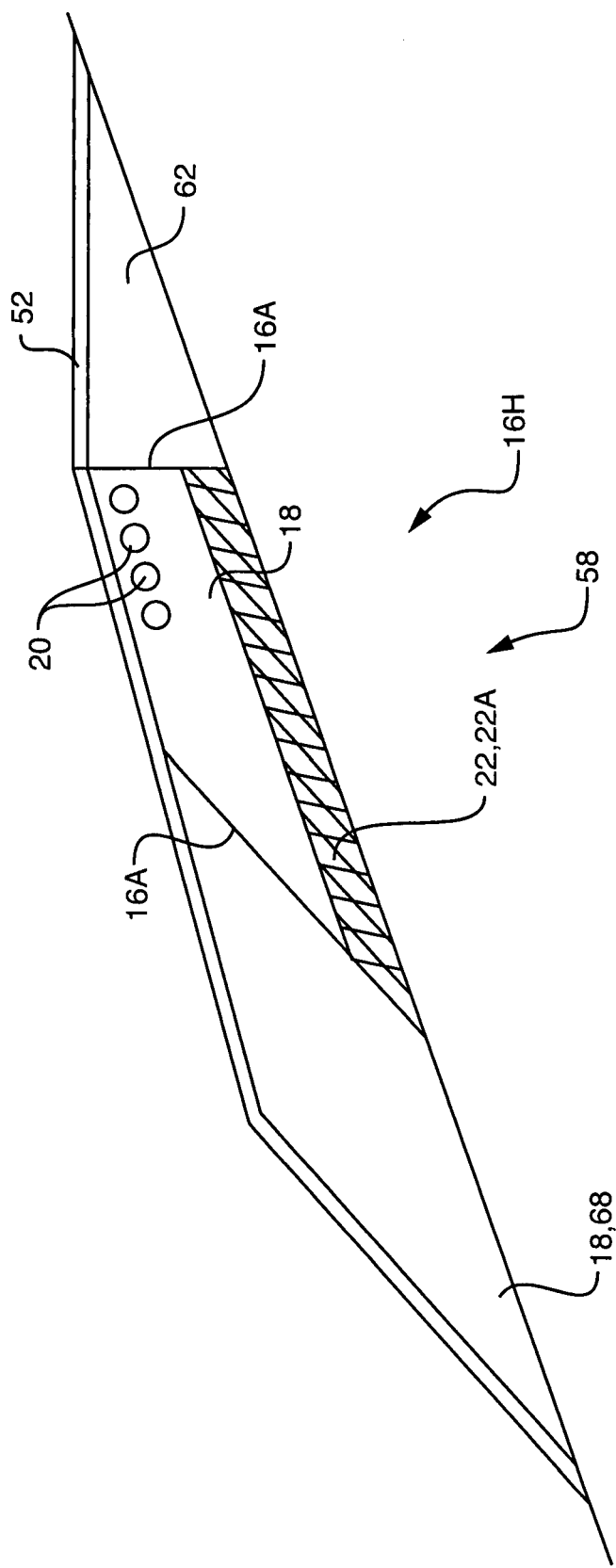
FIG. 9 is a side view showing an embodiment built into a slope, with the drainage/treatment conduit following the slope of the land, but having the carbon source below the leaching system, rather than downhill of it.

FIG. 9 illustrates another embodiment which is also built into the slope of the land, and within which conduit members of drainage/treatment conduit system 20 are laid this time following the slope of the land. However, in this case, leaching system 16H is open to the bottom as indicated at numeral 58. The layer of carbon source material 22 and/or 22A lies below rather than adjacent and downhill of the bed of porous material 18. Membrane 16A is placed along both the uphill and downhill sides of leaching system 16H, but the bottom, below carbon source 22 and/or 22A is left open for the leachate to enter the soil within which aerobic conditions can exit. Thus, the final treatment process of the system takes place within the soil wherein water produced simply dissipates in the soil and nitrogen gas eventually makes its way to the surface and exits into the air. Additional porous material 18 and/or fill or course granulated material 68 may be placed adjacent the leaching system in case any leachate flows downhill. Finally, again the entire system is covered with topsoil 52.

FIG. 10 illustrates another variation with single leaching system 16I. In this case, leaching system 16I is constructed similarly to the embodiment shown in FIG. 7 in that the entire leaching system is enclosed in membrane 16A and wherein perforated conduit 70 is located in a second bed of porous material 18, 26, 44 and/or 68. Venting apparatus 38A and 38B are also included to ensure aerobic conditions in the second bed of porous material. In this embodiment, however, similar to FIG. 1, the entire leaching system is enclosed in membrane material 16A and a liquid drain conduit 24 is contained within the second layer of porous material. However, due to the venting apparatus 38A and 38B and perforated conduit 70, the conditions in the second layer of porous material again become aerobic, and the nitrogen gas produced is vented out taller venting apparatus 38A. Thus, liquid that remains in the enclosed leaching system enters drain conduit 24 and is deposited, in a possible embodiment, into sump system 28 under aerobic conditions. Pump 30, regulated by floats 32A and 32B pumps the effluent liquid up pressure conduit 34 into release conduit 72 which empties onto the surface to deposit the final, clean effluent, or which can empty into a collection vessel or means. Although a sump system is present in this embodiment, its function is to release final effluent as opposed to pumping anaerobic waste mixture into a second leaching system as in the embodiment shown in FIG. 1. Conduit 72 could also empty into any type of collection device such that the clean effluent water could be collected for other uses such as for example irrigation or further purification such as for example chlorination for drinking, or for deposition elsewhere if the local original soil is not porous enough to absorb the effluent. Similarly, any of the embodiments shown, for example, that shown in FIG. 1 could be enclosed in a membrane and have a final release conduit such as conduit 72 therein for collection of final effluent water.

The embodiment or variation shown by FIG. 11 uses a single leaching system 16J, built partially into the slope of a hillside. The embodiment shown in FIG. 11 is essentially the same as the embodiment shown in FIG. 10 except that, due to the slope of the hillside, a sump system and pump are not required. Drain conduit 24 of FIG. 10 that exits leaching system 16I of FIG. 10 is simply replaced by release conduit 72 which directly takes collected final effluent and releases it onto the soil surface downhill from leaching system 16J of FIG. 11 or into a collection device (not shown) if desired.

Figure 12:
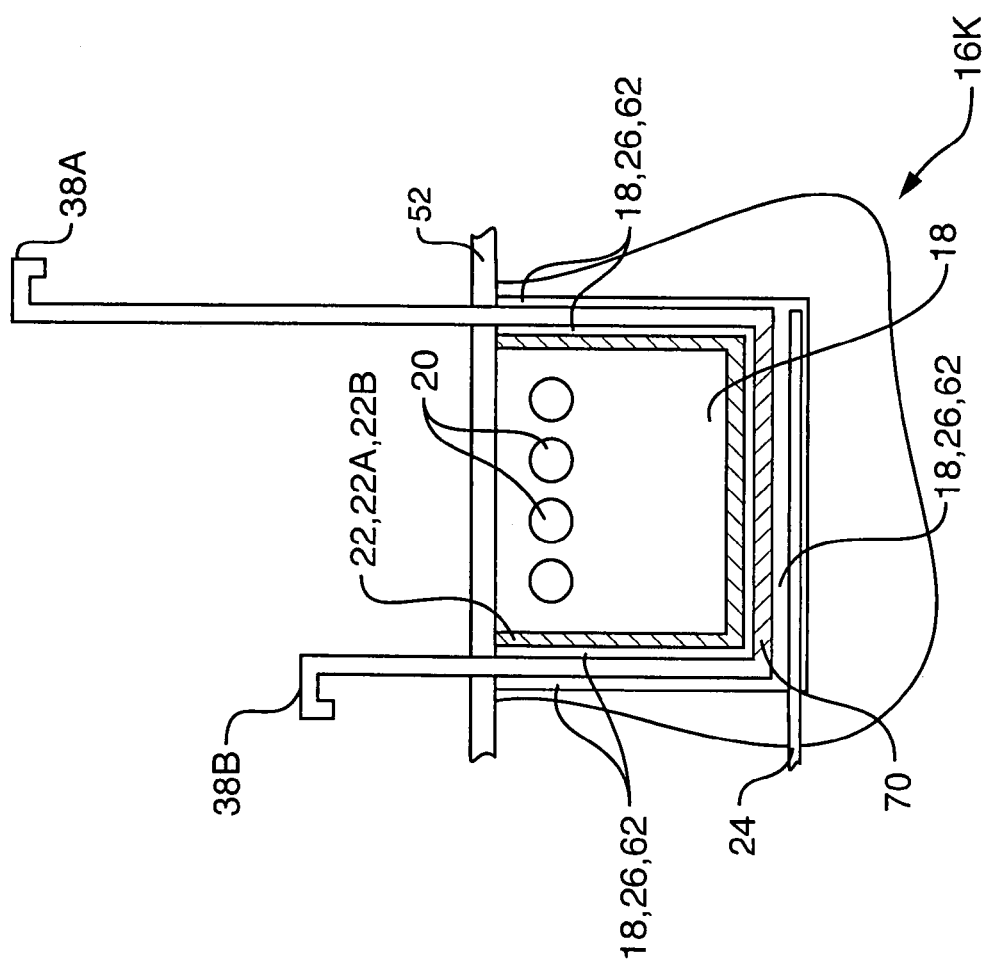
FIG. 12 is a side view showing an embodiment using a single leaching system with the bed of porous material surrounded by carbon source on three sides.
Figure 13:
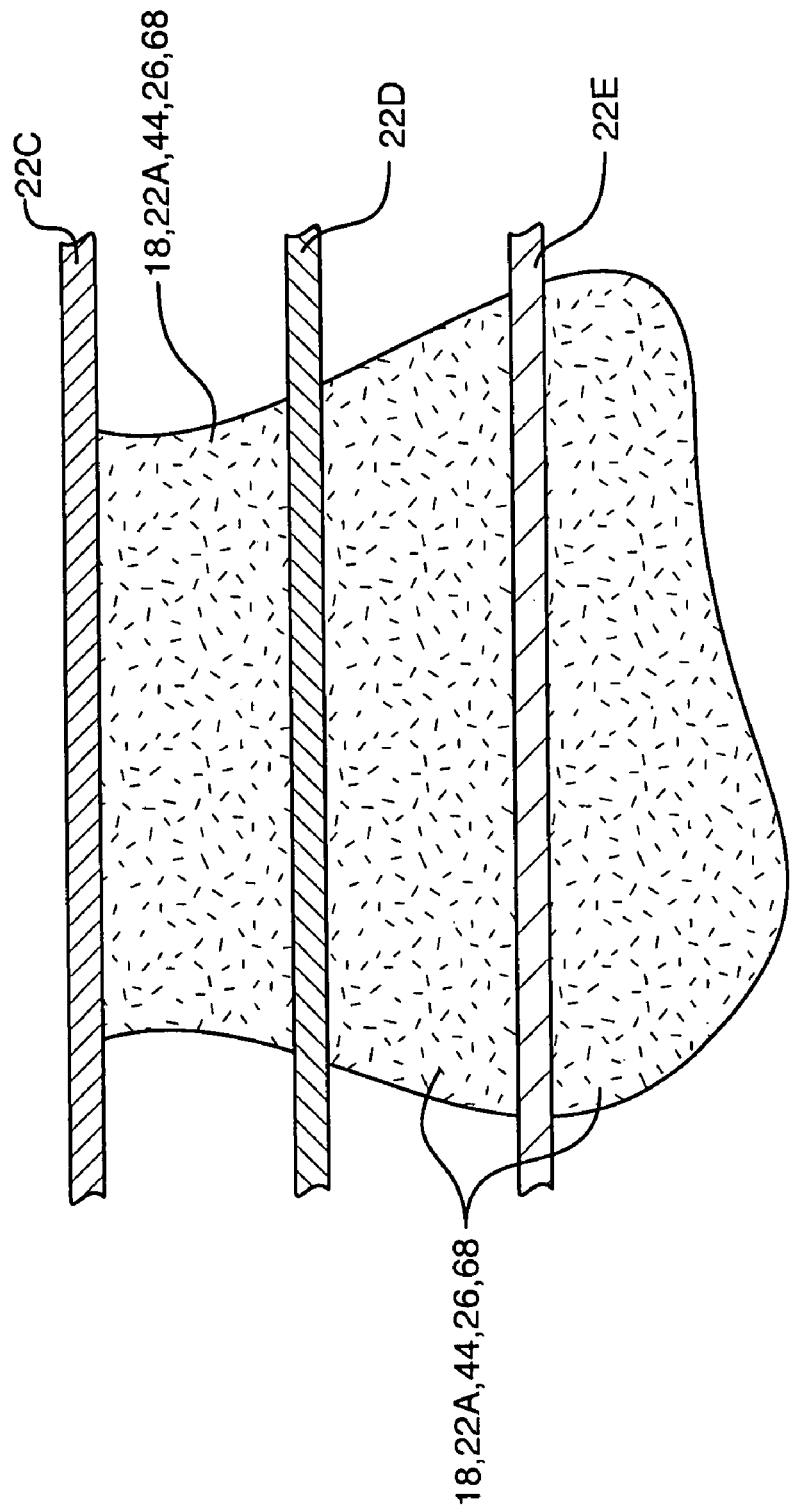
FIG. 13 is a partial side view of an embodiment using several layers of carbon source material of different composition, with a porous material between the layers.

FIG. 12 is a side view showing a system using a single leaching system 16K. However, in this case, rather than enclosing the bed of porous material 18 in a liquid-impermeable membrane, the sides and bottom are enclosed by a carbon source 22 and/or 22A. In such an embodiment the carbon source would be dense enough to create anaerobic conditions therein. Thus the leachate would pass slowly enough through the carbon source to become anaerobic and have anaerobic processes occur therein.

The carbon source in this embodiment can be surrounded by a bed of porous material such as material 18, 26, 44 and or 62 in which can rest porous or perforated conduit 70 into which the leachate/carbon mixture passes and is aerated by venting apparatus 38A and 38B which are connected to perforated conduit 70. In this way, aerobic conditions are again created and nitrogen gas is vented out venting apparatus 38A and the clean effluent exits perforated conduit 70 into the porous material. Also shown in this embodiment is a drain conduit 24 that can be connected to a sump system, an exit conduit 72 that can drain into the soil or a collection device, etc. In addition, depending on the soil conditions and the type and amount of wastes being processed, the perforated conduit 70 and venting apparatus 38A and 38B may or may not be needed or used.

In this and other embodiments, the carbon source can be a loose or packed layer, as noted above, of leaves, wood chips, sawdust, wood, wood shavings but can also include paper, newspaper, cardboard, pressed board, fiberboard, composting material, hay, straw, mulch, grass, charcoal, and/or a loose assemblage of fibers which can be plastic or the like as disclosed in Applicant's patent for multi-layer material for processing septic effluent U.S. Pat. No. 5,954,451 which is incorporated herein by reference in its entirety.

In addition, the carbon source material can come preformed into a board structure which can be simply installed in any location or configuration shown in FIGS. 1-14 rather than having a user be required to obtain and dump appropriate amounts of wood, leaves, etc. into the leaching system as its being constructed. The board form of carbon source can be formed of any combination of any or all of the materials listed above, pressed into a board form for easy transport and installation.

In another variation, the carbon source can be formed into a rollable or more malleable mat type structure for ease for transport and installation. With either a board or mat structure, in order to obtain a layer of carbon source material of a desired depth or thickness, multiple carbon source boards and/or mats can be laid on top of or next to each other, with or without porous drainage material between layers of carbon source material. In addition, carbon source boards and/or mats can be made of various density and/or various composition of different carbon source materials as desired. Thus mats and/or boards of different, varying composition can be layered on top of or next to each other to achieve desired flow and treatment characteristics. Carbon source boards and/or mat forms can also be corrugated in form and/or perforated depending on the flow characteristics desired for the carbon source. Thus, depending on the type of carbon source(s) used, different chemicals/compounds/wastes can be processed in different layers of carbon source whether in the form of loose material, board or mat.

As an example, the carbon source in FIG. 12 could be a mat 22B which could simply be rolled out down a side, across the bottom and up a side of the leaching bed. In the alternative, two types of mat or board could be used—one type for the sides and a different type for the bottom. Such an installation of mat or board would be significantly easier than trying to create such a lining from loose carbon source material. Note though that if using board or mat form carbon source material the joints where different boards or mats meet would be arranged such that the joint would prevent escape of waste material through the joint.

In still another embodiment, rather than having discrete, separate layers of porous material then carbon source material, drainage/treatment conduit 20 could simply be wrapped in a mat of carbon source material and/or surrounded by a bed of carbon source material such as sawdust or a loose assemblage of fibers depending on the desired treatment and flow characteristics.

In addition, as noted above and shown in FIG. 13, various layers of carbon source material can be used in a spaced apart configuration as opposed to, or in addition to, layered directly on top of each other. In this figure three layers of carbon source material are shown separated by layers of porous material 18 or other material such as a silty material. The carbon source material can be in mat form and/or in board form in each of the different layers, or in loose form. Each layer 22C, 22D and 22E can be formed from a different type of carbon source as well. For example 22C could be a grass and straw mat type form, held together with plastic fibers and stitching, 22D could be a pressed wood board form, and 22E could be a layer of leaves and sawdust. Thus, any combination of form and/or material can be used for the various carbon source layers, and the layers can be used directly on top of each other to form a layer of a desired thickness or depth, or can be separated by other drainage material.

Figure 14:
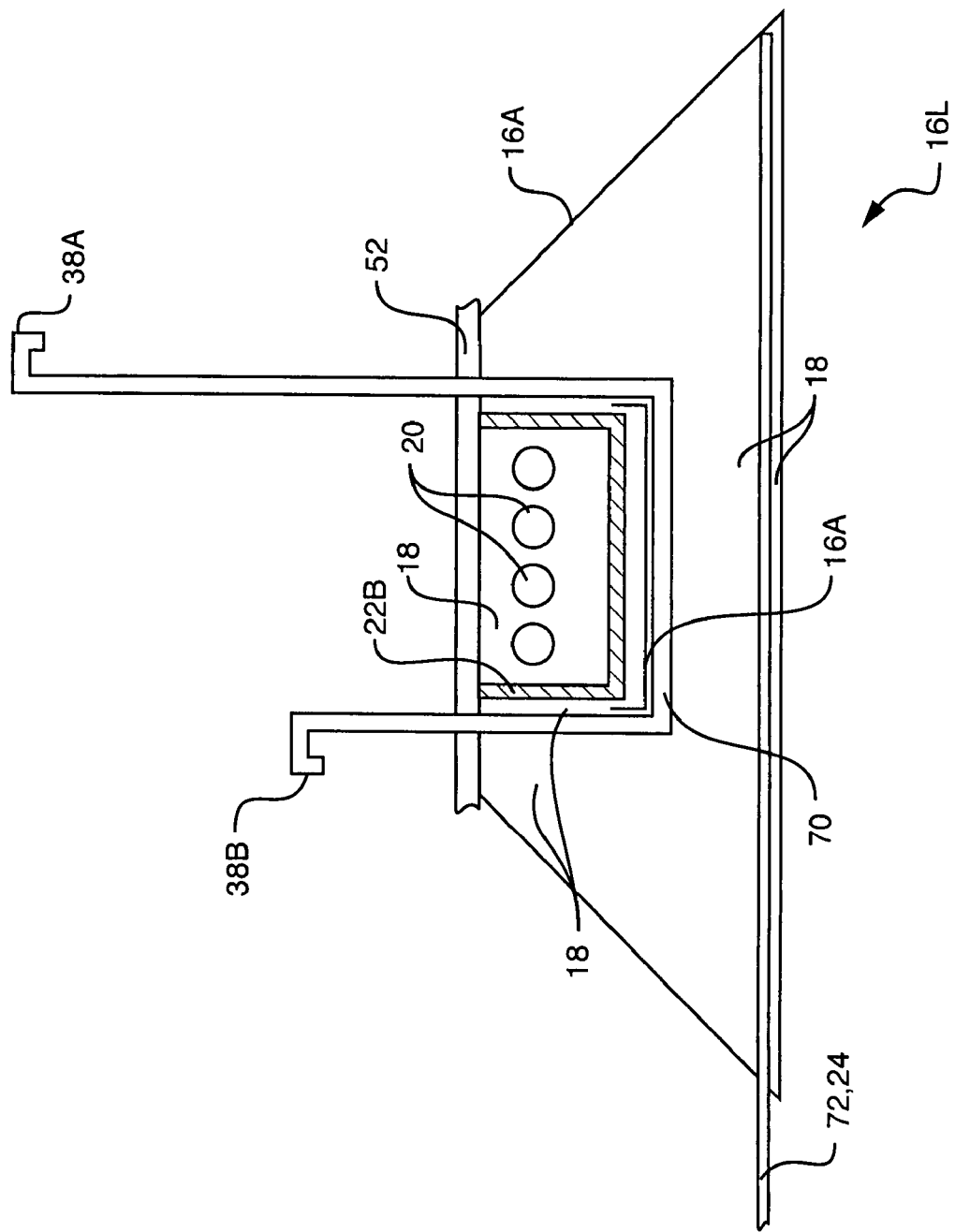
FIG. 14 is a side view showing an embodiment using a liquid-impermeable collection and overflow device to trap and hold effluent in an anaerobic state.

Another embodiment of the present invention is shown in FIG. 14 using single leaching system 16L. In this Figure, again an initial waste supply line has been omitted. In this embodiment a pyramid shaped form 54 is used, but the leaching system can have any desired shape and may or may not be enclosed in a liquid-impermeable membrane depending on the original soil conditions and whether the system will drain directly into the ground or the effluent will be collected and drained elsewhere. In this embodiment, the system is shown enclosed in liquid-impermeable membrane 16A. The entire system is covered with topsoil 52. Drainage/treatment conduit 20 rests in a layer or bed of porous material 18 which is surrounded on the sides and bottom by a layer of carbon source material which can be a mat 22B. Surrounding carbon source material 22B is another amount of porous material 18 and in which rests a "tray" type layer or structure of liquid-impermeable membrane or material with upturned sides, thus forming a tray type structure. This tray or liquid retaining cell of liquid-impermeable material serves to trap and hold the leachate/effluent and, if not already in an anaerobic state, create and maintain an anaerobic state in the leachate in the tray structure. Once the tray structure fills, the leachate then spills out and back out into porous material 18 where conditions again become aerobic. The leachate flows into perforated conduit 70 in this example but could also be directed and absorbed directly into the ground. In this illustration, however, perforated conduit 70 is connected to venting apparatus 38A and 38B and rests in porous material 18 within which can be located, as shown here, a drain conduit 24 and/or an exit conduit 72. Again, however, the venting apparatus may or may not be desired or used, the drain or exit conduit may or may not be desired or used, and the pyramid shape may or may not be desired or used.

Figure 15:
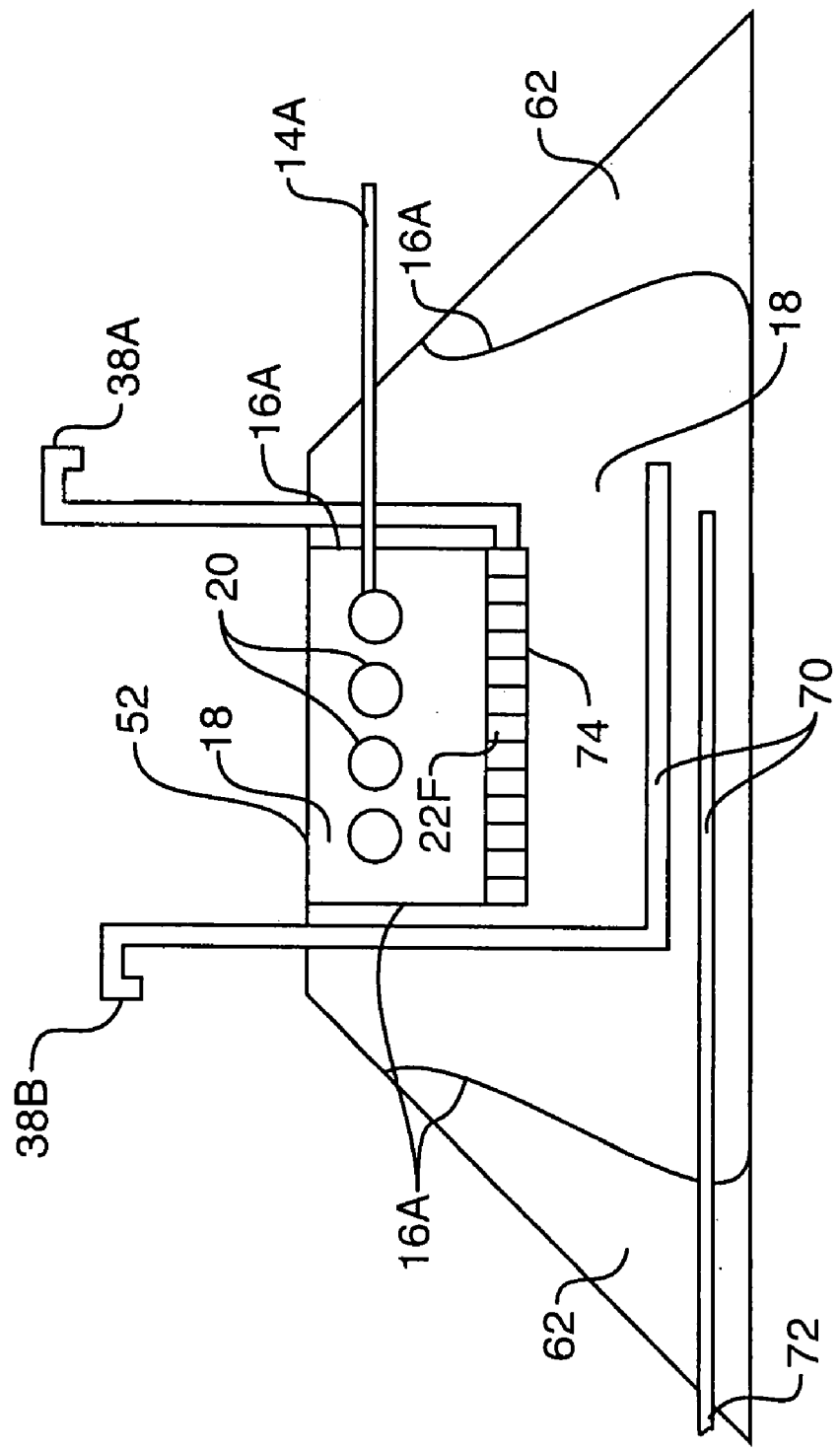
FIG. 15 is a side view of an embodiment the present invention with tray or mat structure in which anaerobic conditions are maintained.

Another embodiment is shown in FIG. 15, having a tray or mat structure and a carbon source that retains liquid sufficiently long to create anaerobic conditions. In this embodiment, the carbon source can either be disposed in, or prior to, or adjacent (with respect to the flow path of the leachate), a tray structure, or can be formed as a mat or tray structure itself forming the bottom "wall" of the first aerobic portion of the leaching system. The bottom structure is shown at element number 74 and, as noted can either be for example a tray, pan, sheet type structure possibly containing a carbon source 22F, or can be formed as a tray, pan, sheet or mat structure which is itself a carbon source. Effluent enters the leaching system shown in FIG. 15 via septic tank exit conduit 14A and flows into drainage/treatment conduit 20 which are laid in a bed of porous drainage material 18. In this particular embodiment, a liquid impermeable material 16A encloses the sides of the bed of porous material of the first leaching system and a bottom wall structure 74 is located across the bottom of the bed. The top is covered with topsoil 52. The effluent passes through drainage/treatment conduit 20 and into the bed of porous drainage material 18 and eventually into bottom structure 74 which, as noted, can be a tray, pan, sheet or mat structure containing, or formed from, a carbon source 22F, connected, in this embodiment to a vent structure 38A to vent gases from the system. Anaerobic conditions are created and/or maintained within the bottom tray or mat structure 74. Once the effluent passes through, or out of, structure 74 it flows through a second bed of porous drainage material 18, and into a second leaching system of porous conduit 70 which is attached to vent 38B through which air is drawn into the system to provide aerobic conditions after the effluent has passed from the anaerobic conditions in structure 74. In this step, aerobic conditions are again created, due to the porous drainage material 18 (which is covered by topsoil 52) and lower intake vent 38B.

As shown in this particular embodiment, once the effluent passes through porous conduit 70 of the second part of the leaching system, it again enters porous drainage material below which is another porous conduit 70 attached to exit conduit 72 by which liquid effluent can be drained off or collected. However, there need not necessarily be an exit conduit. The effluent could simply pass out of perforations in the first porous conduit 70 right into the soil. As another alternative, the entire system, in this or any of the embodiments shown, can be enclosed, as is shown in this figure, in a liquid impermeable membrane 16A except for a portion of septic tank exit conduit 14A and the distal end portion of exit conduit 72 if used. In addition, as noted, any or all of the embodiments shown herein may or may not have a final drain/exit conduit 72, depending on the use(s) of the system, the soil, climate etc. In this particular embodiment, all possibilities are shown together. In this figure, there is a second leaching system, or second part or phase of the entire system, comprised of porous conduit 70 in which aerobic conditions are again created. However, depending on the soil, uses of the system etc., there need not necessarily be a second part or system. The effluent could drain directly into the soil after passing through or out of the tray or mat structure and again encounter aerobic conditions if there is suitable porous soil, and depending on the depth at which the system is buried. But, in this figure a second part or second leaching system is shown. Additionally, there may or may not be a need for the second porous conduit and exit/drain conduit 72 with any of the systems. Or, a porous conduit connected directly to an exit conduit can be used as a second system or second part of the system. Also, an intake vent may or may not be needed. Finally, as noted all or part(s) of the system can be enclosed in a liquid impermeable membrane/barrier but this is also optional depending on the conditions of the system, locale, soil etc. In FIG. 15, the entire system is shown enclosed by a liquid impermeable material 16A. Also liquid impermeable membrane 16A is shown enclosing all sides of the first leaching system, with bottom structure 74 as the only exit for effluent. However, as noted, such a liquid impermeable material can be used with the first, or first part of the, system only, with any subsequent part(s) of the system open to the soil below. Thus, there can be any variation in how a system of the present invention is constructed and laid out, as long as carbon can be provided and anaerobic conditions can be created and maintained for the effluent at some point in the process before the effluent again enters aerobic conditions.

Figure 16:
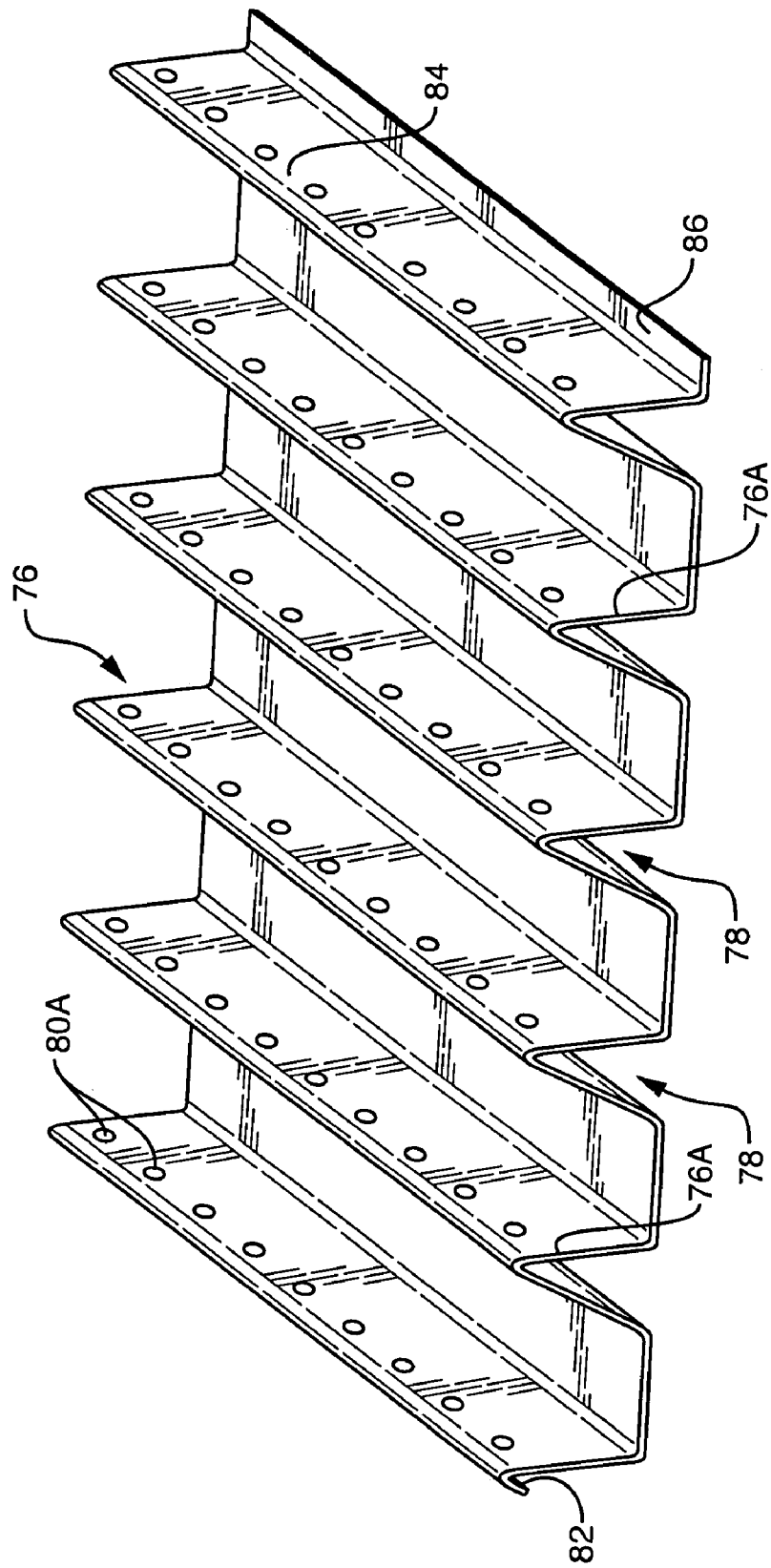
FIG. 16 is a perspective view showing a most simple embodiment of a tray structure or a mat structure.

FIG. 16 shows a simple embodiment of a denitrification structure 76 of the invention, shown here in a tray form and which could be for example used as bottom structure # 74. Such a tray structure 76 can be formed of a liquid impermeable material, can be formed of a semi-porous carbon source material, or can be a liquid impermeable material lined or filled with drainage material and/or carbon source material. The de-nitrification structure can also be formed with a layer of sand, peastone, gravel or other such porous material in the range generally of about less than an inch to a few inches, for example one (1) inch, in depth on which a carbon source can be disposed or above which a carbon source can be placed. Or, as noted the tray, pan, mat, cell structure 76 itself can be formed from carbon source material and contain a layer of porous drainage material for maintaining flow into the carbon source tray structure. Any number of variations of how and where a carbon source is provided is possible—including, as noted, having the tray structure 76 itself be formed of a carbon source material.

As shown in the embodiment of FIG. 16, the tray structure 76 can be corrugated to provide various walls formed by the main tray forming corrugations 76A to allow liquid to fill up the tray structure and to provide void space 78 for liquid to flow when exiting tray 76. Tray 76 can optionally have outflow holes such as round shaped outflow holes 80A just below the top of the tray 76. Tray 76 can also include an overlap portion 82 for attachment to an adjacent tray 76, and a receiving overlap portion 84 for attachment to an adjacent tray 76. Also included can be a foot 86 along one side edge of tray 76 which rests on the bed of porous material on which tray 76 is laid, to balance or stabilize tray 76. Such a tray structure can be used in any of the embodiments of the invention, for example forming bottom structure 74 of FIG. 15. Tray 76 can be used with a carbon source laid therein, or just above, or adjacent prior to tray 76 in a leaching system flow path. In addition, sand, gravel or other material can be laid in the bottom of tray 76 whether or not a carbon source is disposed in tray 76.

Although shown as a tray, the de-nitrification structure of the present invention can be any type of retaining device such as for example a tray, pan, shield, sheet, cell, and the like which can have any number and arrangement of dents, detents, corrugations, ribs and the like therein or thereon. Examples of various internal corrugations are shown below in FIGS. 21A-E. As shown and described below in FIGS. 17-20, the de-nitrification structure of the present invention can also have any number and arrangement of internal dividing structures such as for example walls, protrusions and the like. Such walls, protrusions and the like are generally slightly lower or less in height than the main outer walls of the structure such that the structures can be stacked together for storage and transport, liquid can flow over and around them, and a cap or shield can be placed over them.

Figure 17:
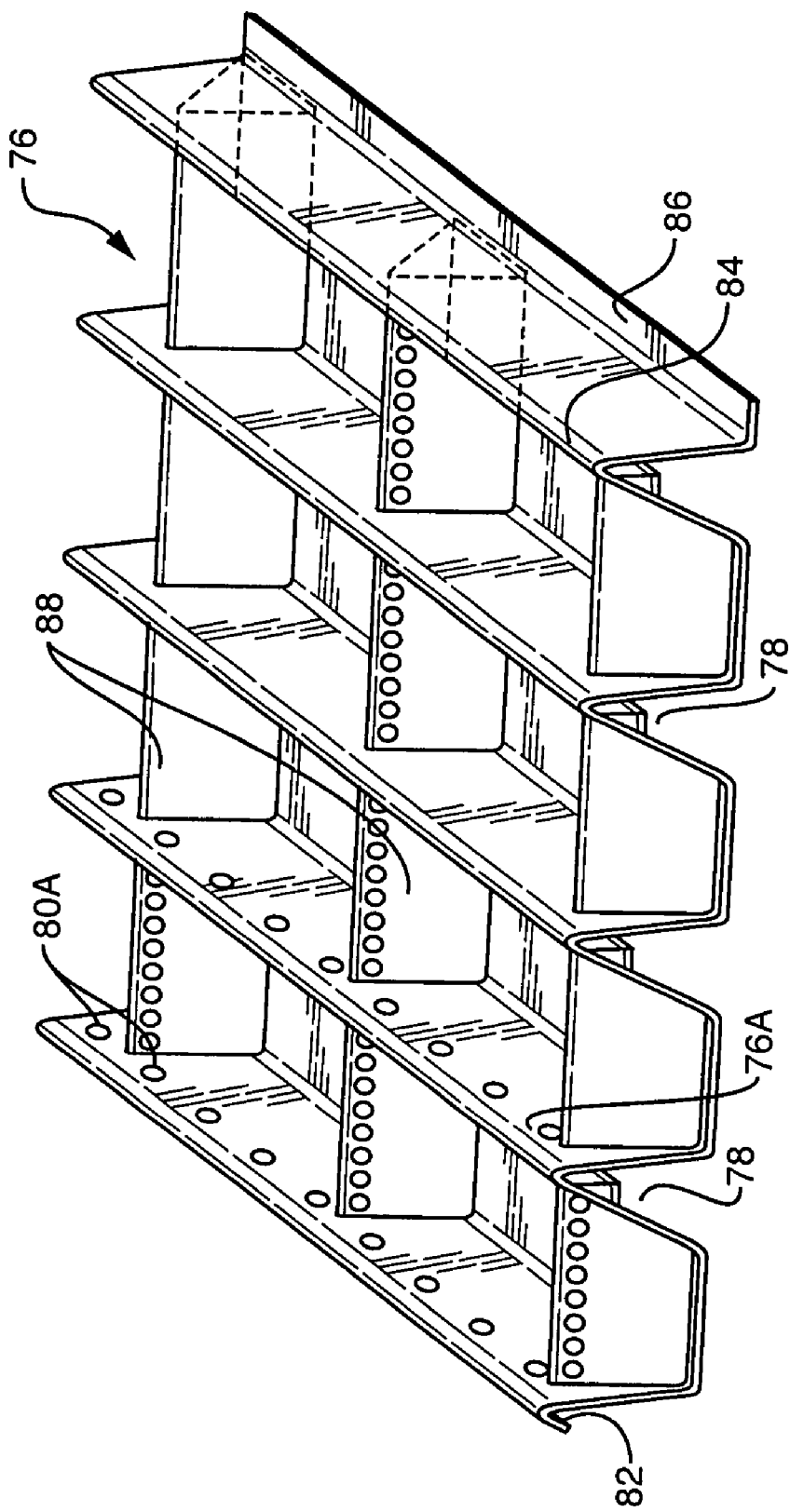
FIG. 17 is a perspective view showing an embodiment of a tray structure having internal dividing means.

FIG. 17 shows another embodiment of tray 76 having internal dividers 88 therein. Any number of internal dividers 88 can be used, making any number of internal compartments or sections. Tray 76 can be used with a carbon source laid therein or just above or adjacent prior to tray 76 in a leaching system flow. Also shown are examples of round outflow apertures or openings 80A. Such openings can be formed near the top of any of the dividers and/or main corrugations or walls of a tray device 76. Here, openings 80A are shown along some of the main tray-forming corrugations and some of the dividers, but can be present along all main corrugations 76A and dividers 88, or only selected main corrugations 76A and/or dividers 88. Overlap portion 82 allows for connection or attachment of a tray structure to an additional tray structure 76, by overlapping with receiving overlap portion 84 of the tray 76 to be attached or joined. Foot or edge structures 88 allow tray 76 to rest or sit level and stably on a bed of porous drainage material 18.

Figure 18A:
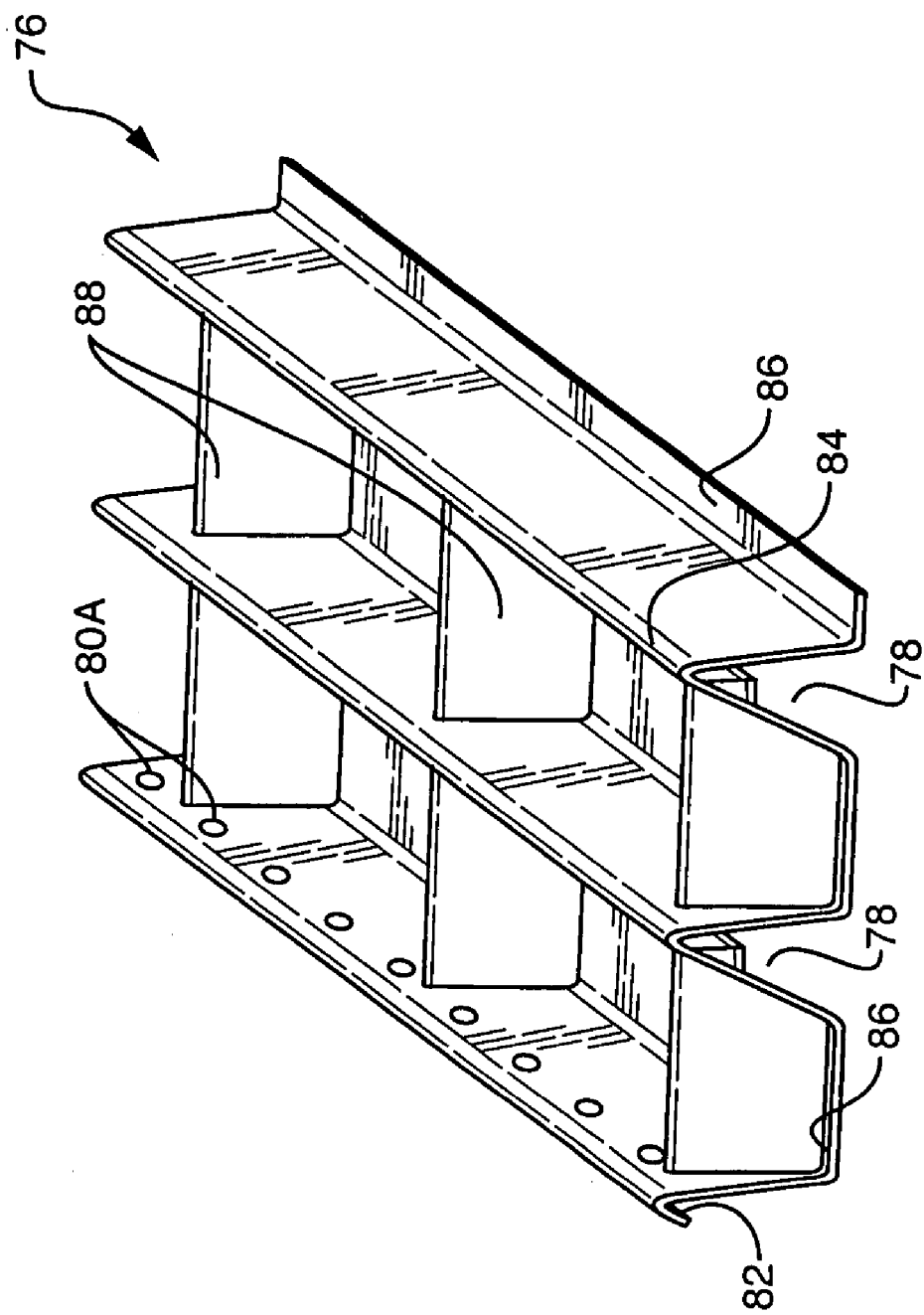
FIGS. 18A-C are perspective views showing embodiments of tray structures, having various size, and which can be connected to form tray structures of various size.
Figure 18B:
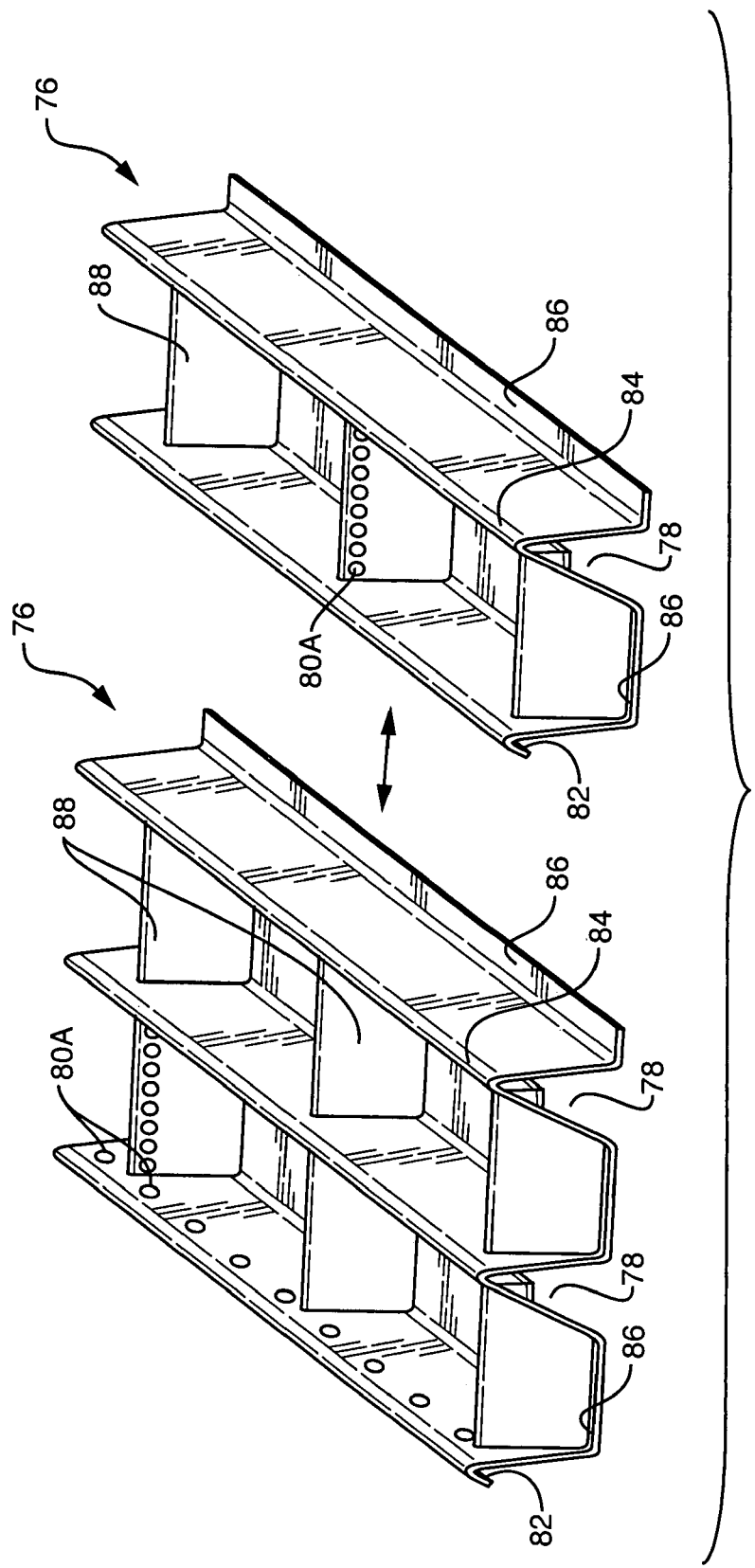
Figure 18C:
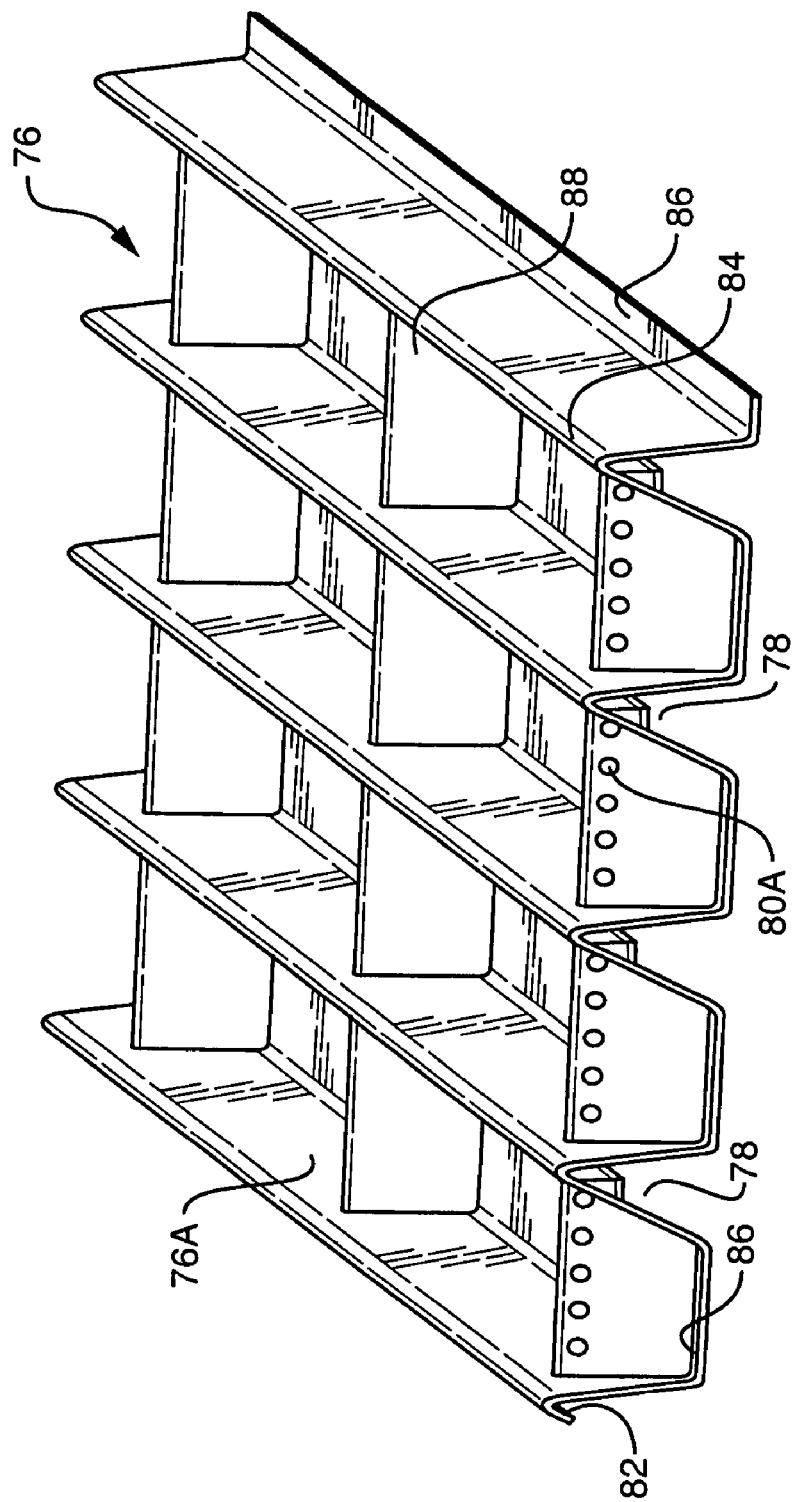

FIGS. 18A-C show various trays or cells 76 of various sizes separately and attached to other trays or cells 76 to form larger tray structures as desired or needed. For example, FIG. 18A shows a two-column tray structure. FIG. 18B shows a two-column and a single-column tray structure. The two-column structure is attachable to the one-column structure by overlapping overlap portion 82 of the single column tray upon, and hookingly attaching to, receiving overlap portion 84 of the two-column tray to form a three-column tray. FIG. 18C shows a four-column tray 76 that can be formed all as one piece, can be formed by attaching two two-column trays or four single-column trays. Thus, the tray structure 76 can be made in any size, either as a single piece or as smaller units or cells that can be attached to form a final tray of any desired size or shape. Trays can also be attached lengthwise end-to-end, not only side-to-side. Each tray 76 can have receiving end 90 and overlap end 92. Although any size tray or other structure can be formed, as a non-limiting example, a tray structure of the present invention—either as a single unit, or a structure formed of multiple smaller units—can be in the range generally of about eight (8) feet in length by about four (4) feet wide. The tray, mat, sheet, pan, etc. structures of the invention are formed, regardless of what, if any internal features they contain, such that they are easily stackable on each other for easy handling.

Figure 19:
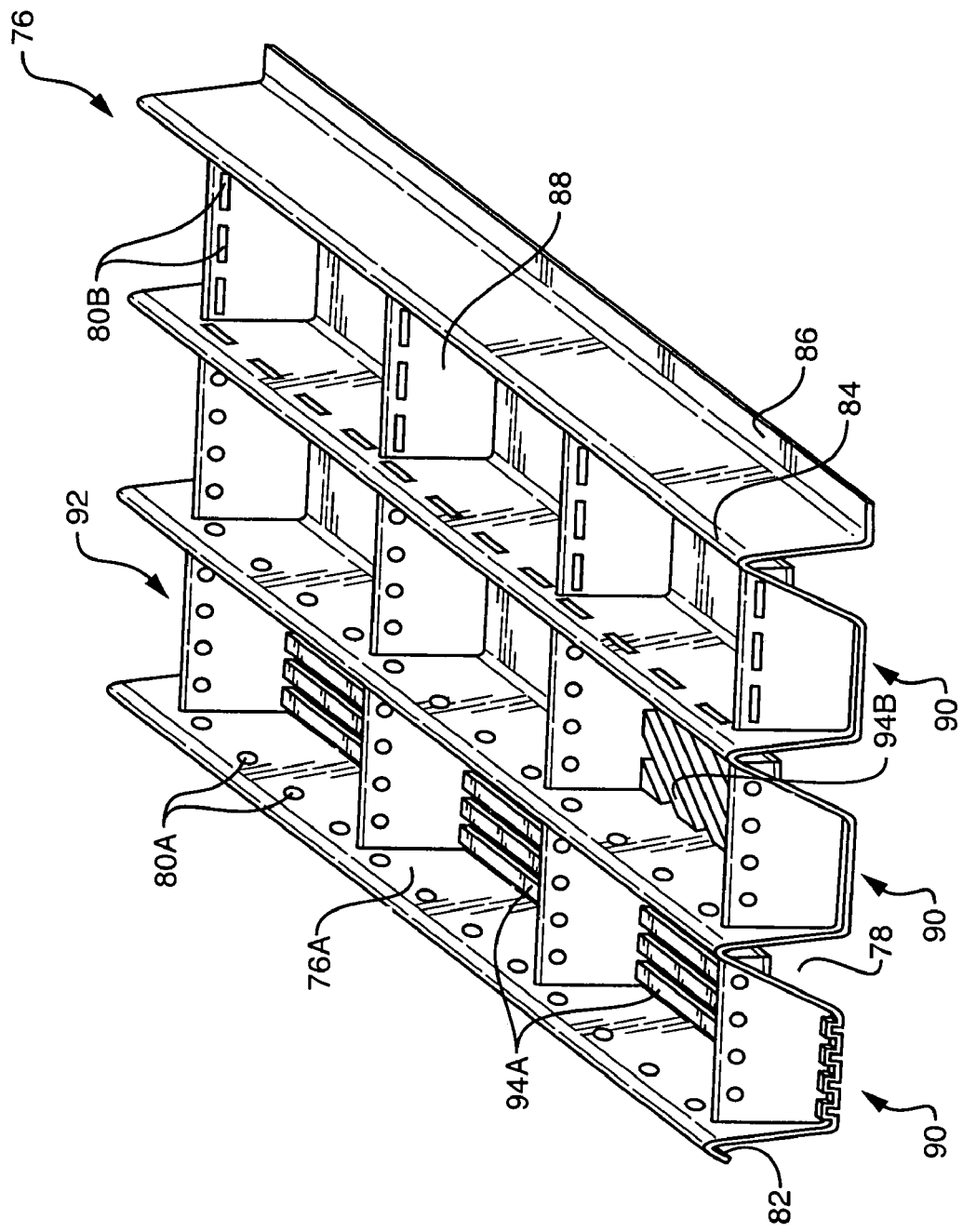
FIG. 19 is a top perspective view of a tray type structure of the present invention showing internal dividers, various corrugations and outflow apertures.

FIG. 19 shows yet other variations possible with the de-nitrification/treatment tray structure 76. In this Figure, round outflow apertures 80A are shown, as well as rectangularly shaped outflow holes 80B. The outflow apertures can thus be any size or shape, and in any arrangement or pattern. Also shown in this example are bottom internal axial corrugations 94A that run parallel to the long axis of tray 76. Such internal bottom corrugations can also run diagonally, as shown by diagonal bottom corrugations 94B. Bottom internal corrugations 94A and/or B provide additional void space between the tray bottom and the bed of porous drainage material on which tray 76 rests. Further detail showing the bottom of a tray structure 76 is presented below and in FIG. 28. The major corrugations forming the walls of the trays provide the main void space 78 into which the leachate falls when exiting the outflow holes 80A, B, etc. The main corrugations 76A forming the walls of the tray 76 and any bottom internal corrugations are not packed or filled with anything, but form void space to provide aeration once carbon-treated, anaerobic leachate leaves tray 76. Conditions within tray 76 will be anaerobic, and need to again become aerobic once the leachate exits the tray 76 for further processing of waste/effluent to occur.

Figure 20:
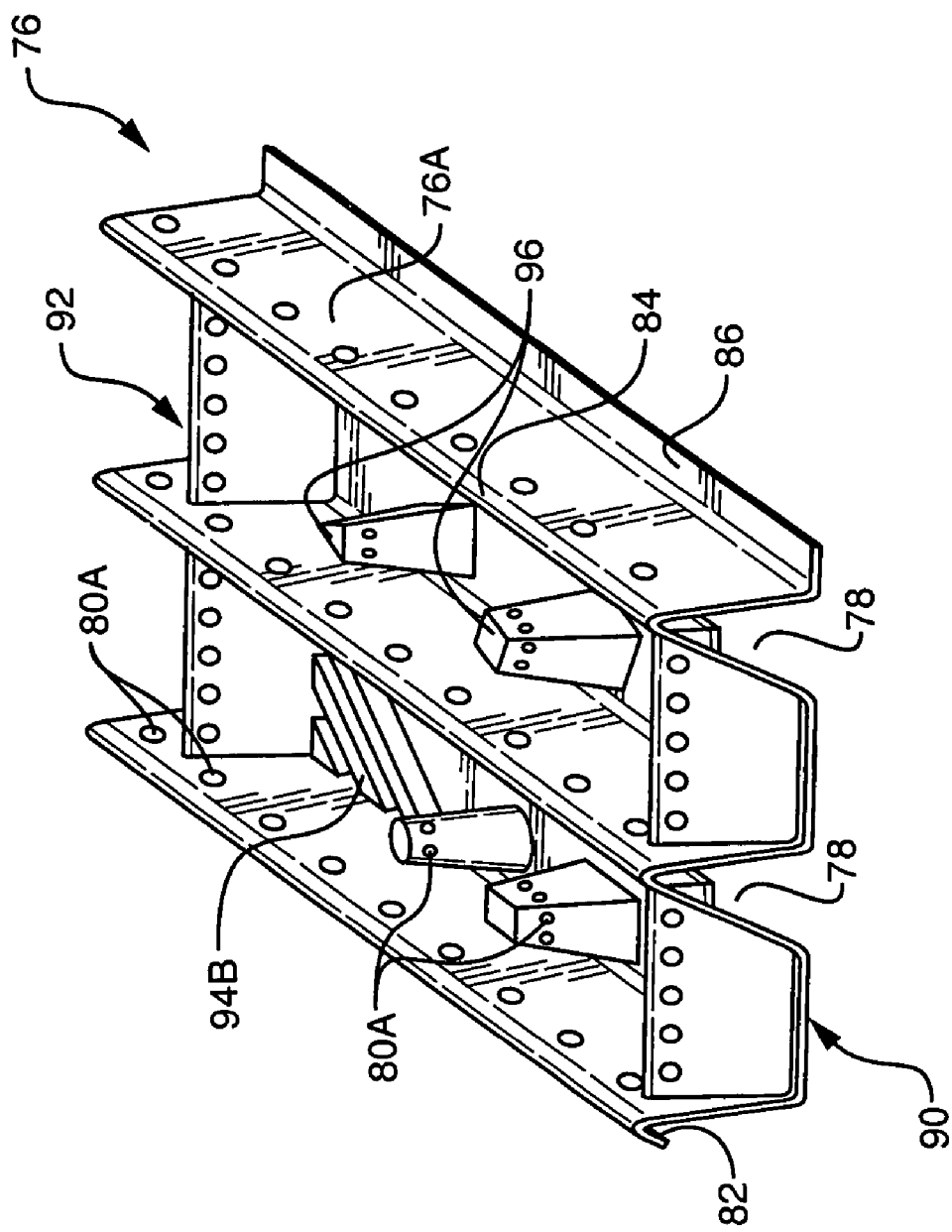
FIG. 20 is a top perspective view of a tray type structure of the present invention showing example corrugations, and protrusions which allow effluent outflow.

FIG. 20 shows yet another possible variation, using protrusions 96 extending up from the bottom of tray 76 and having outflow holes therein, rather than having internal dividers 88. However, both dividers 88 and protrusions 96 can be used together in one tray 76. Also shown, for illustration, are a few diagonal bottom internal corrugations 94B, which may or may not be desired or needed, and which can also be formed as lengthwise corrugations 94A. Although not shown in this figure, bottom internal corrugations can also run perpendicularly to the long axis of a tray 76. Shown here is a two-column illustration, but again, any size tray 76 can be made. If bottom corrugations 94A or B are used, and trays 76 are formed such that they are joinable end-to-end to other trays 76, any bottom internal corrugations can stop before the end of the tray(s) on one or both ends (depending on how and how many trays will be joined). The bottom internal corrugations would stop such that the ends of the trays at end overlap portion(s) 90 and receiving end overlap portion(s) 92 can overlap closely and snugly without hitting any corrugations along the bottom of the trays. However, if length-wise axial bottom corrugations are used that can themselves overlap peak to peak and valley to valley just as the main corrugations 76A of the trays overlap when joined end to end, such corrugations can run the entire length of each tray being joined.

FIGS. 21-24 add yet other variations to the de-nitrification/treatment tray structure 76 of the present invention. FIGS. 21A-E show two additional possible features of the invention. FIG. 21B shows a cap or shield structure 98 that fits over the main tray-forming corrugations 76A. Also shown are side internal corrugations 100 that run up the walls formed by the tray main corrugations. The cap 98 serves to keep materials such as sand, gravel, fill, carbon source fibers and the like from falling in and filling and/or clogging the tray 76. Cap 98 still allows liquid to move up the walls of the tray to exit into the void space 78 formed by the main tray corrugations 76A, and eventually enter the ground or fill below the tray 76. Liquid is directed up the walls of the tray by way of the side corrugations 100 which keep cap 98 at a distance from the walls of the tray, thus allowing and actually forcing liquid to move up along the valleys between the peaks of the side corrugations 100. In these figures, the tops of the side internal corrugations 100 are open such that when the liquid level reaches the tops of the side corrugations, it simply flows over the tops of the corrugations 100 and drains into the void space 78 formed by the walls of the main tray corrugations 76A. However, the side internal corrugations 100 can be closed and there can be outflow apertures 80A/B along the top of the main tray wall corrugations 76A, as shown in FIG. 17, for example. In addition, the side corrugations as shown do not extend up the total height of the walls of tray 76, especially at the two outside side walls, so that overlap portion 82 and receiving overlap portion 84 can interact closely to connect two adjacent tray structures 76 if desired. In addition, side corrugations 100 do not extend up to the top of the tray 76 so that liquid does not spill over the top of the tray. Liquid must exit through outflow apertures or open tops of side corrugations. Similarly, if trays 76 are to be joined end to end, any side corrugations would stop before the end of each tray, on one or both ends, such that trays can be overlapped end to end at tray end overlap portion(s) 90 and tray end receiving overlap portion(s) 92. However, if a tray is formed that is not intended for overlap or joining, any internal side corrugations can continue the entire length of the walls. Thus, there are many variations of ways to have liquid flow within and exit tray 76.

Figure 21C:
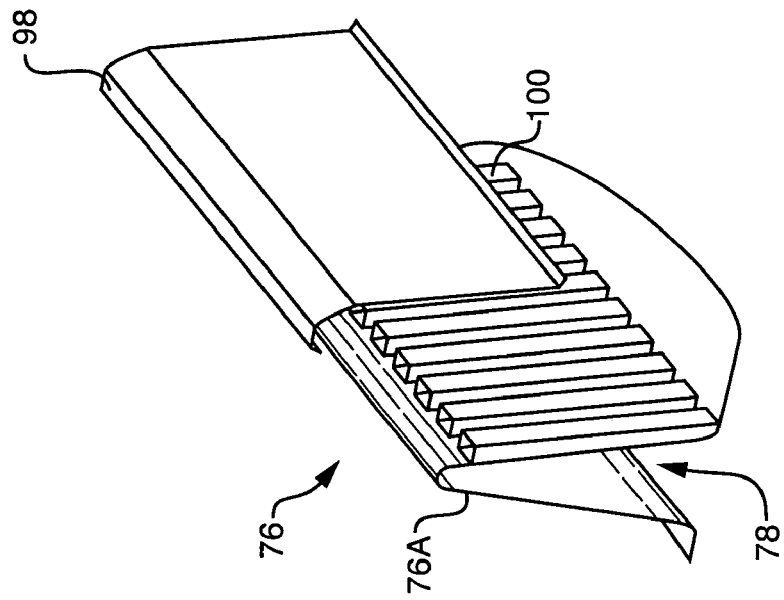
Figure 21B:
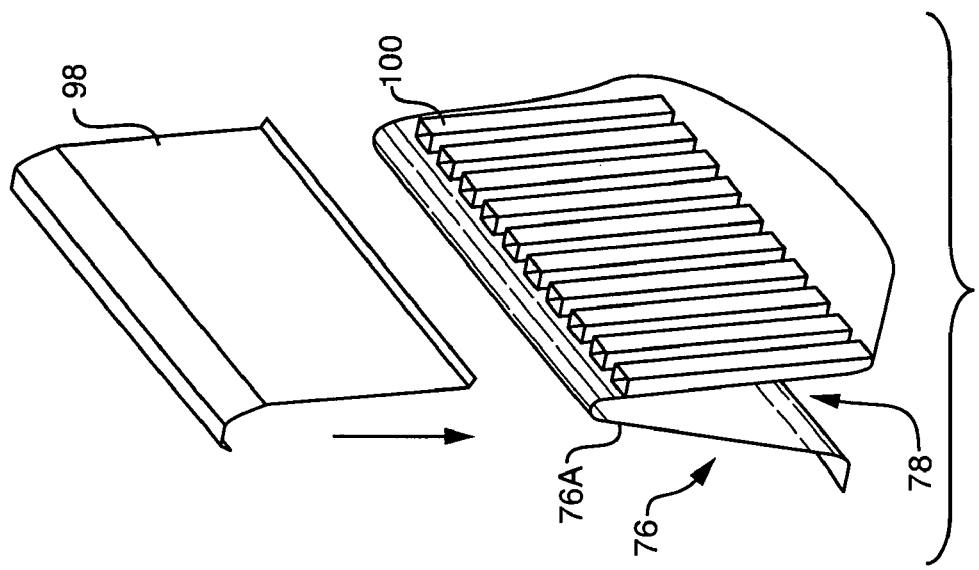
Figure 21A:
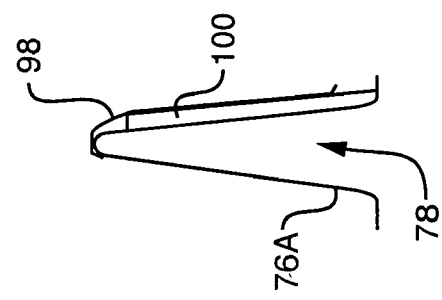

FIGS. 21A-E show various views of the side corrugations 100 and cap or shield 98. FIG. 21A is a side view showing cap 98 installed, and illustrating how side corrugations 100 keep cap 98 at a distance out from the sidewalls of the tray. FIG. 21B shows a cap 98 in position above a tray 76, ready to be installed. And FIG. 21C is a perspective view showing a cap 98 partially installed on a tray 76. FIG. 21D is a perspective view of a single column tray 76 with a cap 98 shown in place above it, ready to be lowered onto tray 76.

Figure 21E:
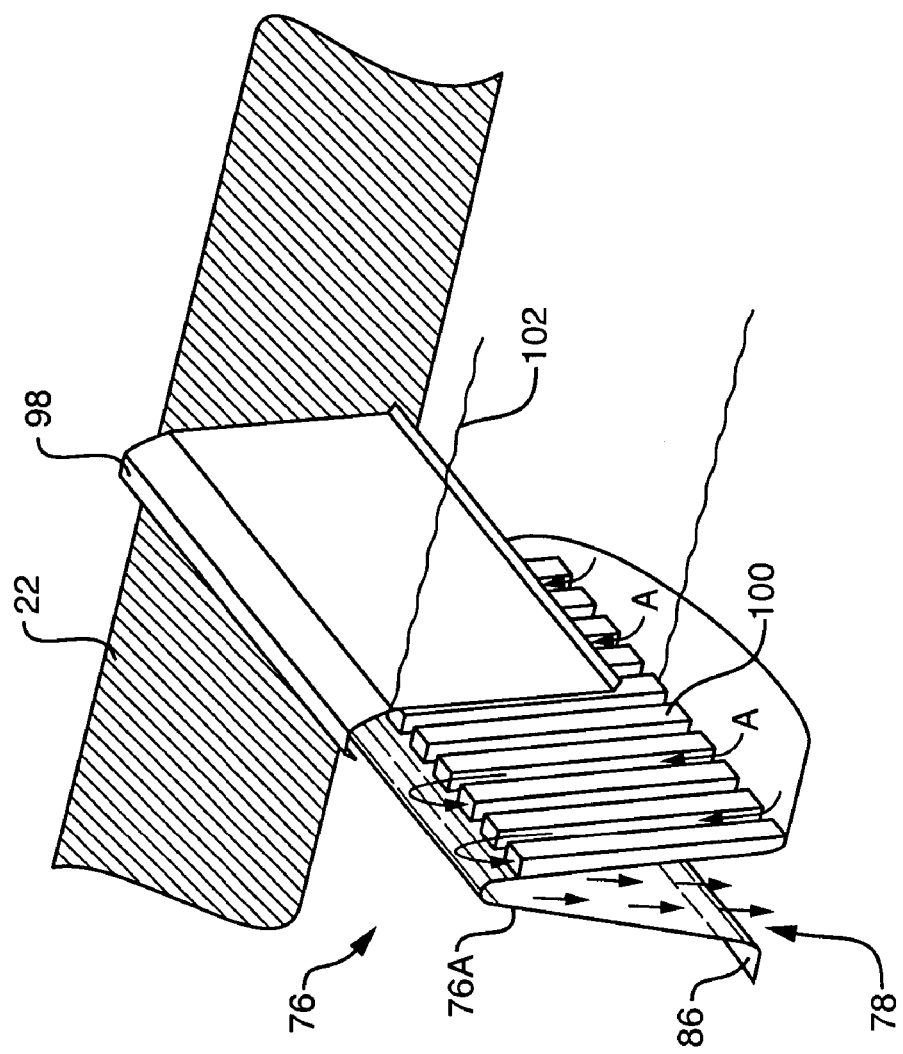

Finally, FIG. 21E shows, for illustration purposes, a cap 98 partially in place on a tray 76 to show the path, described above, that liquid takes when the tray is in use in a leaching system. The arrows indicate the path of liquid, up along the side internal corrugations 100, out the, in these examples, open tops where the side corrugations 100 stop, and down into the void space 78 formed by the main tray corrugations 76A. The liquid level 102 is shown along the outside wall of cap 98 and a carbon source 22 is shown filling tray 76 such that the liquid must pass, or is forced, through the carbon source as the liquid fills the tray 76. Liquid is then forced up the corrugations and out the open tops of side corrugations 100. Thus, a constant liquid level is maintained, and therefore anaerobic conditions are maintained. Fluid must pass through the carbon source then up the walls of the tray to exit. Although the carbon source 22 is drawn towards the rear of the figure, this is only cut away to show the liquid level, the cap 98 and the tray structure 76. The entire tray structure 76 can be filled with carbon source 22. In the alternative, the entire tray structure 76 can be filled with, for example gravel, peastone, or the like, to provide a path for liquid to flow within tray 76. Also, any combination of gravel, stone and carbon source could be used. For example, a couple of inches of peastone can be put in the bottom of a tray 76 and a carbon source mat laid on top of the stone. There can be stone filled to the top of the tray, with a carbon source on top of the stone, and thus above the tray. Alternatively, there can be no stone at all, and a carbon source can entirely fill the tray. Thus, any combination of tray and carbon source can be used as long as liquid is forced through a carbon source and to the bottom of tray 76, then up the walls of tray 76 before exiting into void space 78.

Figure 22C:
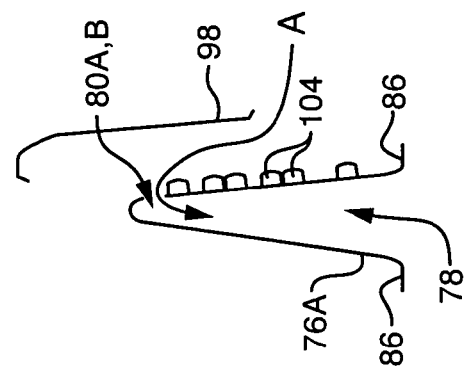
FIGS. 22A-D are perspective views showing a cap structure, and a tray structure having protrusions or dimples to keep space between the cap structure and the tray structure, along with outflow holes.
Figure 22B:
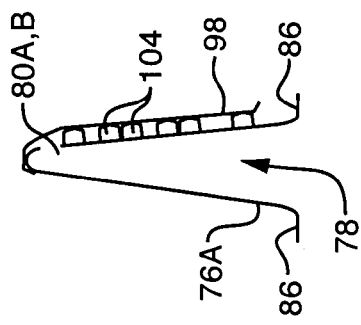
Figure 22A:
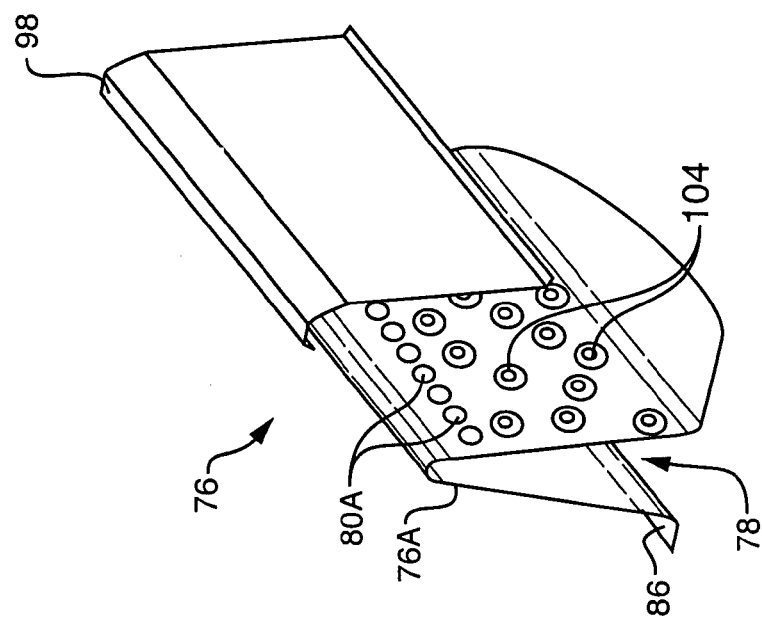
Figure 22D:
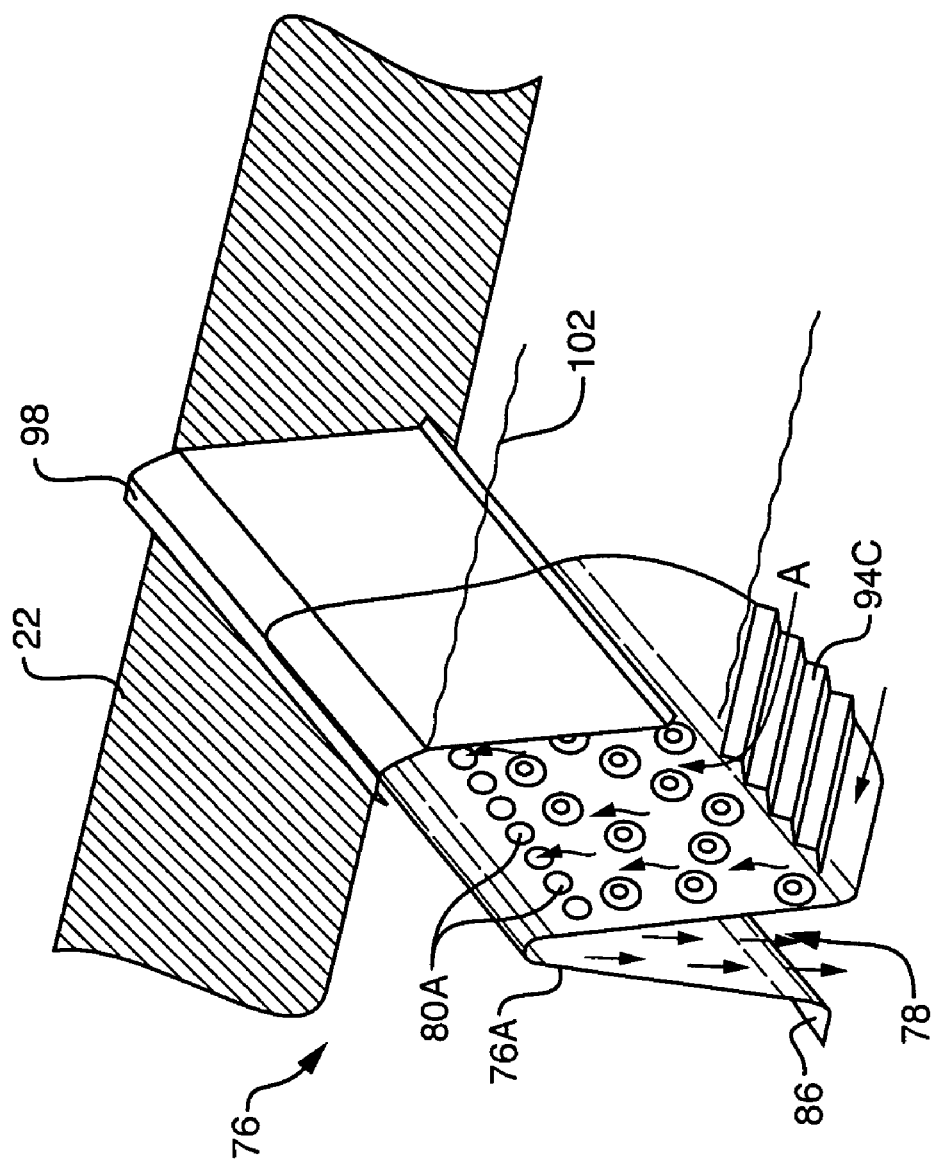

FIGS. 22A-D show variations in tray structure other than side corrugations, but which all accomplish the purpose of maintaining liquid level and forcing liquid through a carbon source, to the bottom of the tray and up the sides before exiting. In these figures, side protrusions or bumpers 104 are located along the walls of tray 76. Similarly to the side corrugations 100 the bumpers 104 keep cap 98 a distance out from the walls of the tray, and provide a path for liquid to follow up to outflow apertures 80A. Also, as shown in these examples, the bumpers stop below the full height of the walls of the tray 76 or the tops of the internal dividers 88, partially so that trays can closely overlap, partially to keep a cap or shield 98 a distance separated from the walls of the tray, and partially to provide room for outflow apertures. FIG. 22A shows a cap 98 partially in place on a tray 76. FIG. 22B shows a side view of a cap 98 installed. FIG. 22C is an expanded view, with the cap 98 shown not fully installed for the purpose of showing the path that liquid takes, as shown by the arrow A, as it fills the tray 76 then exits. Lastly, FIG. 22D shows a view similar to FIG. 21E in which a carbon source 22 is shown filling the tray 76, a liquid level 102 is shown, and the path of liquid up along bumpers 104 is shown, with the path of the liquid being shown by the arrows A. Again, the carbon source 22 is cut away and drawn towards the rear of the figure to allow the other features to be shown. Additionally, bottom internal horizontal corrugations 94C are shown, simply to illustrate with these embodiments that contain various side liquid flow means, that the bottom of the tray structure 76 can also have some structures thereon such as various corrugations.

Figure 23A:
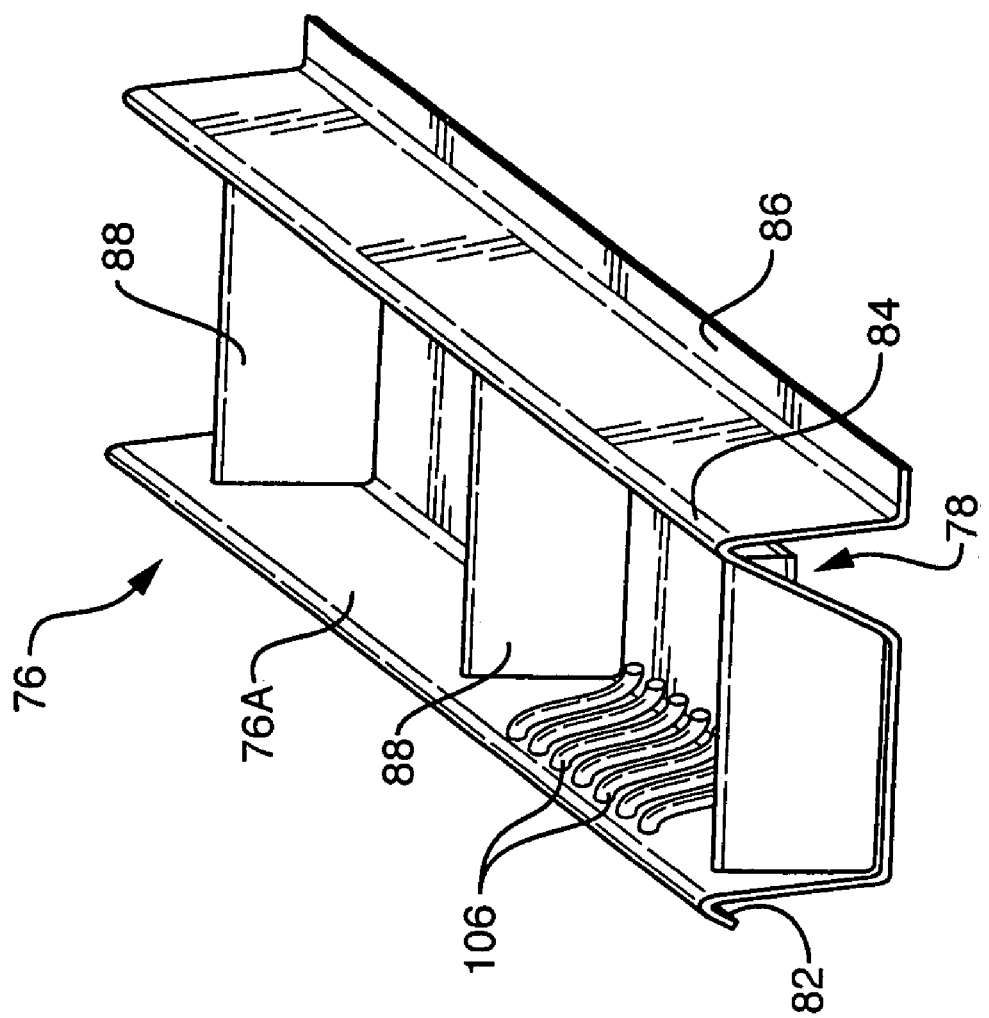
FIGS. 23A and B are perspective views showing a cap structure, and a tray structure having tubes to keep space between the cap structure and the tray structure and which exit into the space created by the dividing means.
Figure 23E:
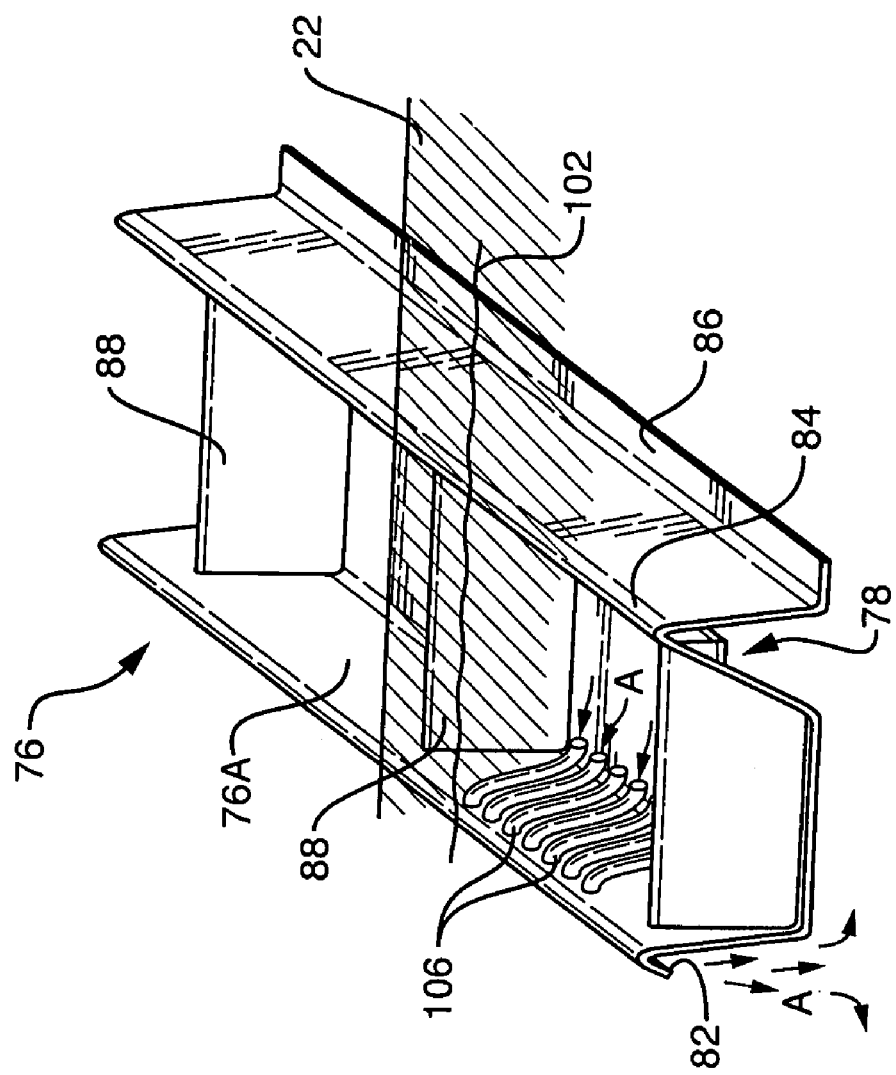

FIGS. 23A and B illustrate yet another embodiment of the invention, having tube devices 106 along the walls of tray 76. FIG. 23A is a perspective view of a tray 76 without a cap, showing several tube devices 106. Also, as with embodiments shown in FIGS. 21 and 22, the tops of the tube devices 106 are below the top of the wall or internal divider 88, to allow for the channeling and regulation of liquid flow only up and out of tube devices 106. FIG. 23B is a view similar to 21E and 22D, however in this case not showing a cap. A liquid level 102 is shown, and the path of the liquid is shown by the arrows A.

The liquid flows up into the tubes devices 106, travels up inside the tube devices 106 and exits tube device 106 through the side wall into the void space 78.

Figure 24:
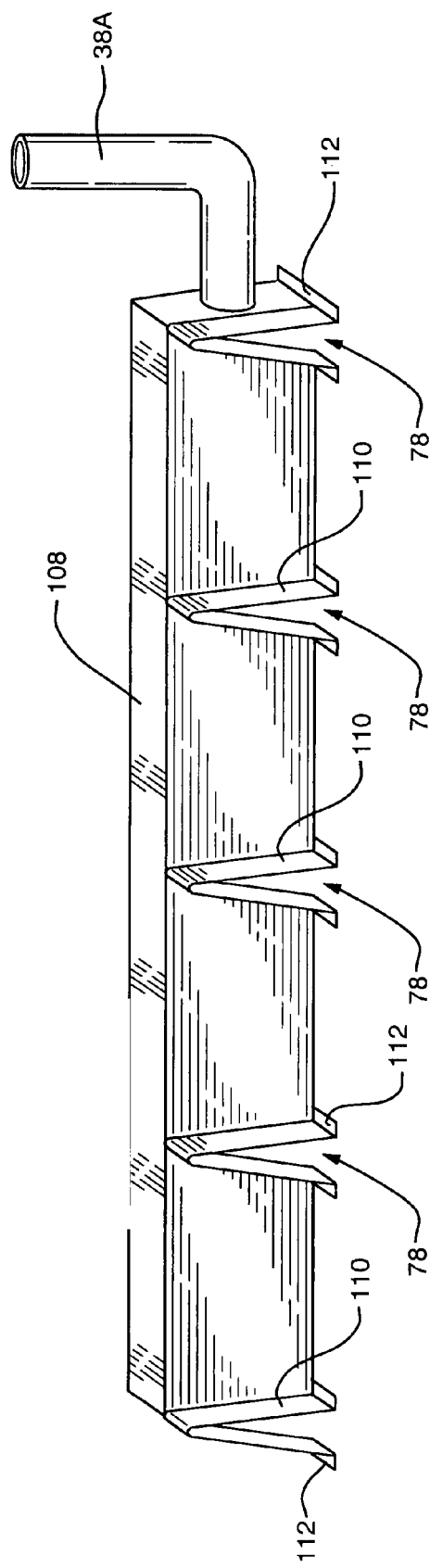
FIG. 24 is a side view of a gas exit vent structure.

FIG. 24 is a side perspective view illustrating a venting apparatus such as a venting manifold 108 that could be used with tall exit vent 38A. Manifold 108 is attachable to an end, 90 or 92, of a tray structure 76, such that inserts 110 fit within the main tray corrugations 76A that form void space 78 within which gas collects as the de-nitrification processes occur. With manifold 108, gases can all be collected and directed up tall vent 38A. Manifold 108 can be shaped also with a foot or flat edge 112 to assist in leveling the manifold 108, and inserts 110 to fit within main tray corrugations 76A.

Figure 25:
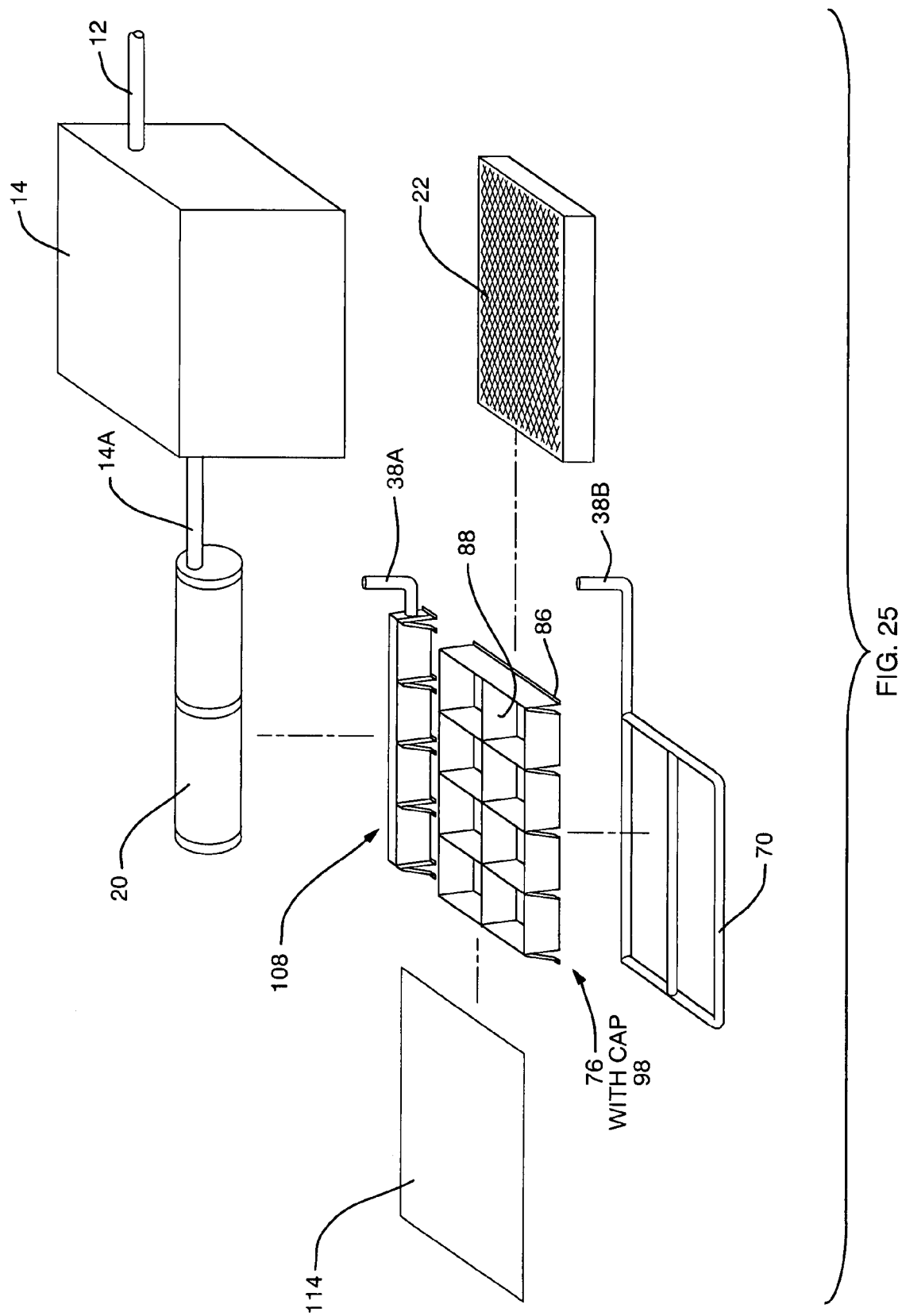
FIG. 25 is an exploded perspective schematic view of a septic system using the tray structure with a gas exit vent structure, a gas intake vent and porous piping for final aerobic treatment of effluent.
Figure 26:
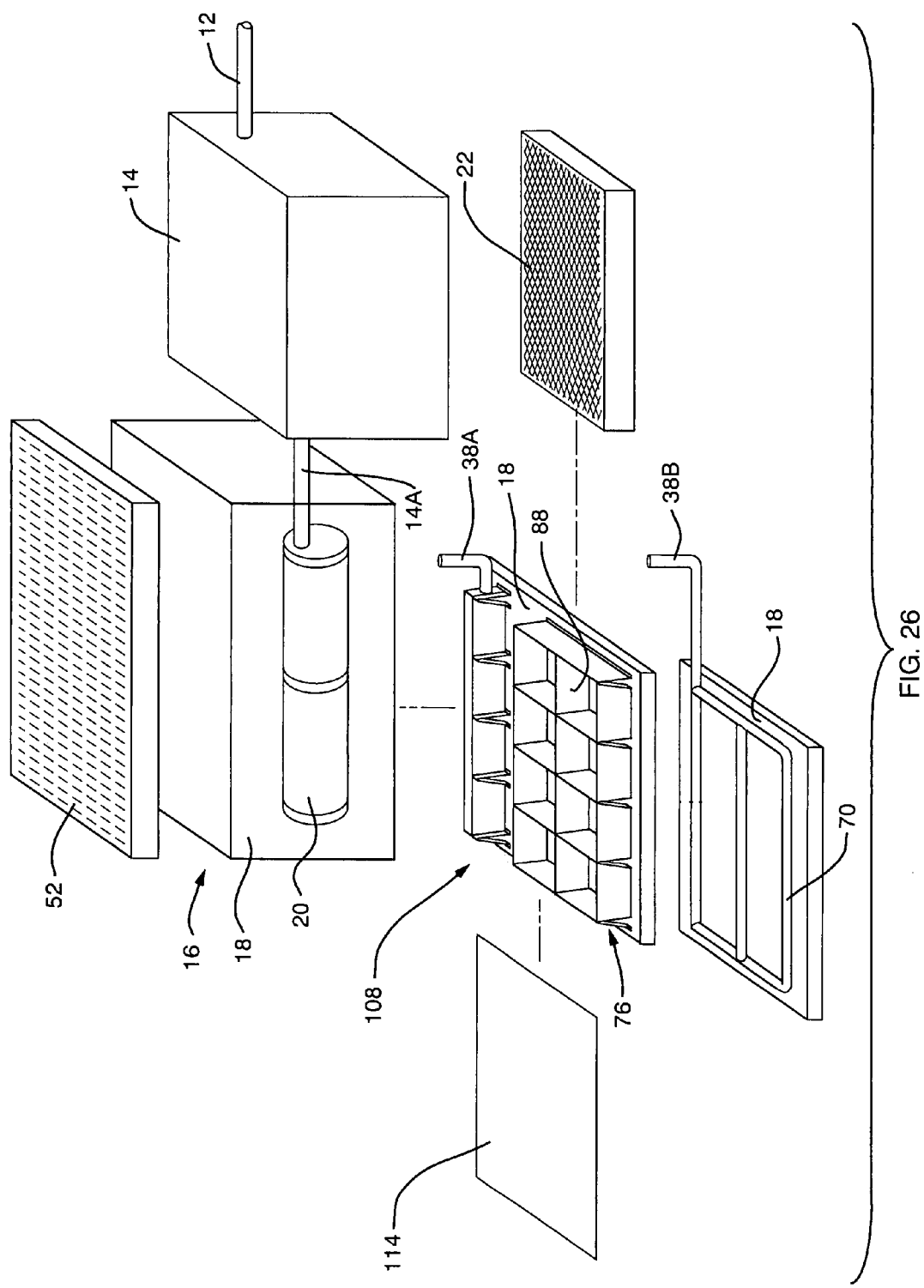
FIG. 26 is an exploded perspective schematic view of a septic system similar to FIG. 25 but showing the topsoil, fill, an example of a carbon source and example protective covering for the tray structure.

FIGS. 25 and 26 are views of an example system of the invention. FIG. 25 is an exploded view showing an example system, minus illustration of the various layers of fill and/or porous drainage material, for ease of illustration. Waste enters initially through inlet 12 flows to septic tank 14—neither of which is part of the invention. Then wasted flows through tank exit conduit 14A and into first leaching conduit 20. After liquid passes through the first leaching conduit 20 it passes into carbon source 22 and then tray 76 in which anaerobic conditions are created and maintained. Also shown is an optional cover structure 114 to be placed over the capped tray 76 to further prevent fill and/or porous drainage material from entering the tray structure. Cover structure 114 can be any type of liquid-permeable material that allows liquid to pass therethrough, but not solids such as sand. Cover 114 also should be a material that will not dissolve or break down in the presence of liquid, such as for example polyethylene woven fibers or other like material. After liquid exits the tray 76 it can flow through porous drainage material to an optional second leaching system, having porous conduit and lower intake venting apparatus 38B, which is being drawn on by taller gas exit vent 38A's action, to ensure return to aerobic conditions. In FIG. 25, (a side view), venting manifold 108 connected to taller gas exit vent 38A, which collects and vents gas as it forms in void space 78, is shown. A perspective view of a tray 76 is shown separated for illustration purposes. In use in a leaching system, manifold 108 would be connected to an end of tray structure 76.

FIG. 26 is a similar view to that of FIG. 25, however, with some of the layers of topsoil, fill, porous drainage material etc. shown. Topsoil 52 covers the entire system. The first leaching conduit system is shown in a bed of porous drainage material 18. Again, manifold 108 is shown separated from tray structure 76, and they are shown in a bed of porous drainage material 18. As shown, a taller, gas exit venting and drawing apparatus 38A can also be used, if needed, to remove gas collected in void space 78 as a result of the anaerobic processes occurring in tray 76 and/or gas formed in the second aerobic conditions after the leachate exits tray 76. If used, cover structure 114 is placed over the entire tray system 76. Shown below tray system 76 is an optional second conduit system shown in a bed of porous drainage material 18 with shorter air intake vent 38B, and porous conduit 70. Not shown in FIGS. 25 and 26, but as noted above with other embodiments, final effluent could be collected in an exit conduit, as shown in FIG. 15 wherein there is another porous conduit 70 below the second leaching system, connected to an exit conduit 72, for drainage to a distant location or for collection for other use. Also as noted with other embodiments, the second conduit system shown in FIGS. 25 and 26 need not necessarily be used. If the native/original soil is suitable, with sufficient drainage and filtering capacity, the treated effluent exiting tray structure 76 can drain directly into the soil which provides second aerobic conditions and final treatment/digestion. Whether or not a second leaching system is used depends such variables as the location, climate, soils, and use(s) of the system.

Venting apparatus, such as vent 38A and 38B in all embodiments shown herein, can be formed from solid conduit material or can also be formed from a perforated or porous conduit material wrapped or covered in a fiber, woven or mat type material such that gases are directed up the vent conduit but not out the sides, yet liquid such as condensation can escape out into the soil as the gases travel up the vent conduit. Also, rather than having a solid manifold structure such as manifold 108, tray structure 76 can be overlaid at least one end, with a woven or fabric type material to collect and contain gasses from void space 78 and direct them into a perforated conduit laid along at least one end of tray structure 78 and which is in turn connected in flow communication to a solid conduit forming tall vent structure 38A.

Figure 27:
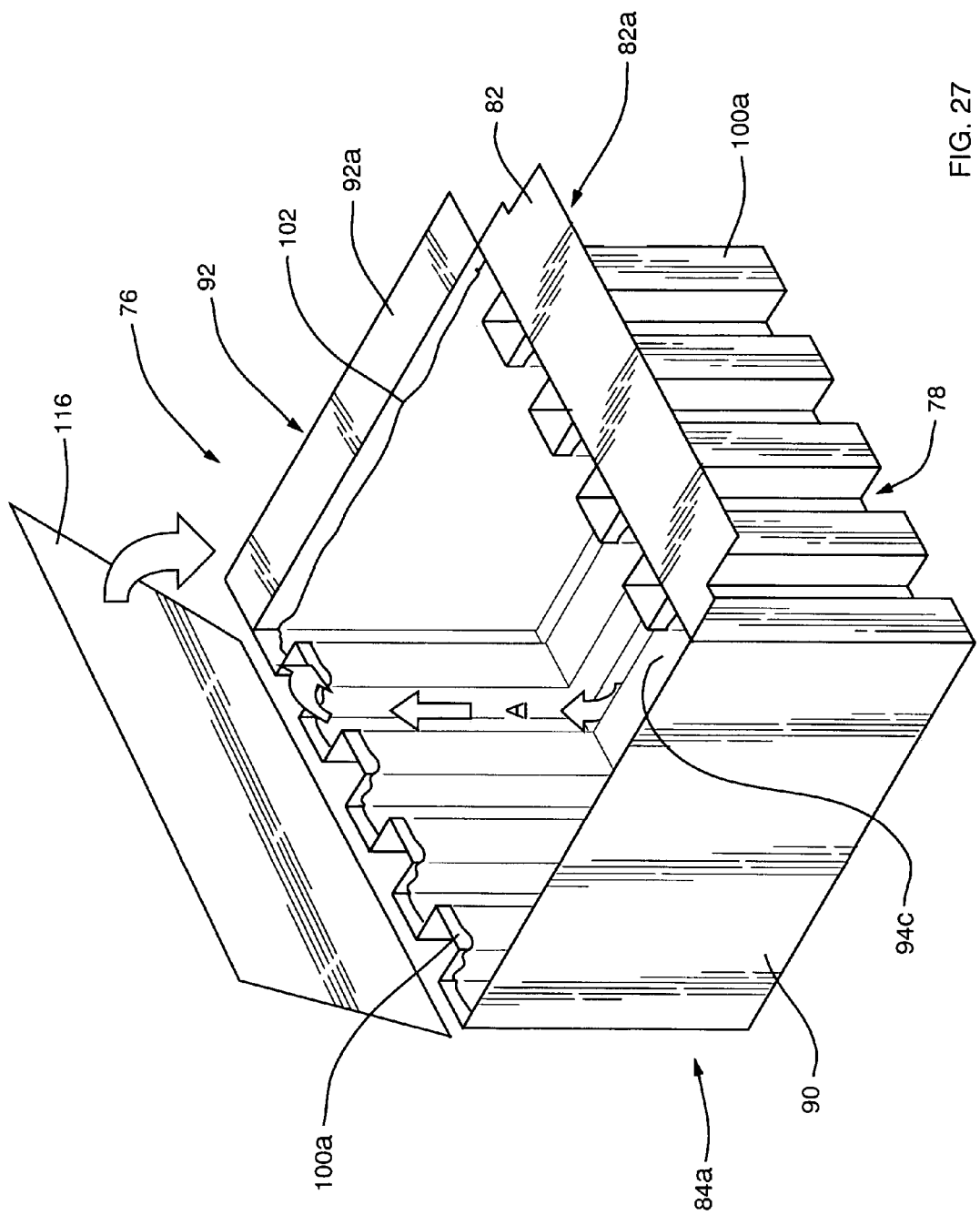
FIG. 27 is a perspective view looking down into a tray structure or "cell" structure having side and bottom corrugations, and showing a flow plate in position above the tray to be slid down along the side wall corrugations.
Figure 28:
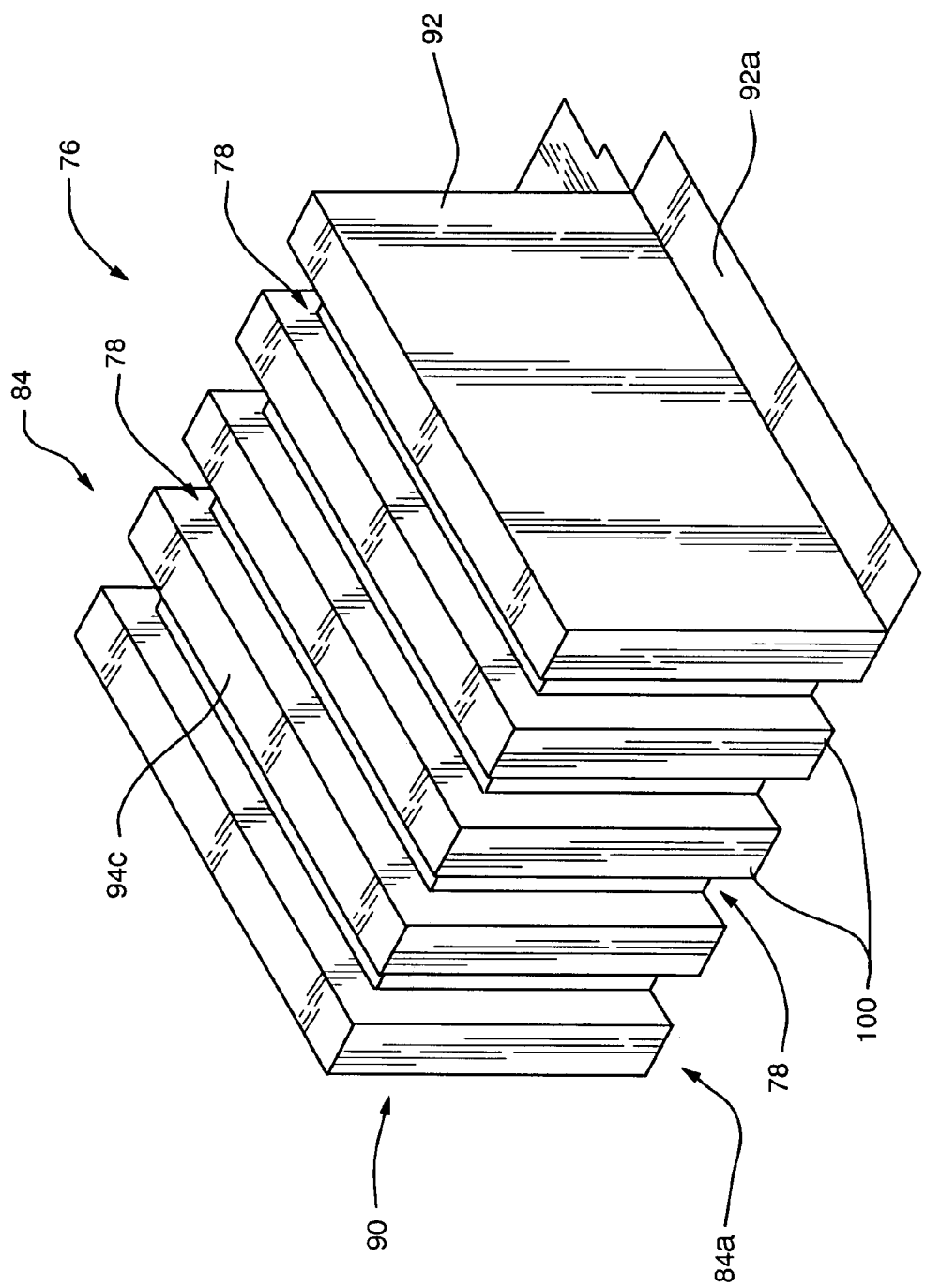
FIG. 28 is the same tray or cell shown upside down to further illustrate its form and shape.

FIGS. 27 and 28 illustrate other embodiments of a tray or cell type structure for creating and maintaining anaerobic conditions. Such a structure will be called a "tray" for ease of reference but it is any multi-sided fluid containment or liquid-retaining structure having a bottom and an open top. FIG. 28 is simply a bottom perspective view of the tray 76 shown in FIG. 27. In this embodiment, ends 90 and 92 are not corrugated. However, sides 82a and 84a are corrugated with side corrugations 100a. The bottom is also corrugated with horizontal corrugations 94c. End overlap portion 92a is used to attach tray 76 end-to-end to another tray if desired. Similarly side overlap portion 82 is used to attach tray 76 side-to-side to another tray if desired. A liquid level is shown at 102, and a direction of fluid flow is shown by arrows A wherein liquid flows in to the bottom of the tray 76 then up the valleys of the side corrugations 100a until it reaches the tops of the corrugations where it drops out of tray 76 into void space 78 on the outside of tray 76 between the outsides of the corrugations 100a. A fluid flow plate 116 is shown above tray 76 ready to be slid down along side 84a. Plate 116 rests, along its bottom edge on the tops of the peaks of bottom corrugations 94c, and rests up against wall 84a along the tops of the peaks of the side corrugations 100a. Plate 116 is held in place in the corners of tray 76, at either end of wall 84a. Thus, fluid enters the top of tray 76, passes through a carbon source then must move up along the side corrugations 100a from the bottom of tray 76 to flow up along and between the side corrugations 100a and plate 116 in order to exit out the top of the side corrugations 100a. Plate 116 ensures that nothing but fluid enters side corrugations 100a and ensures that all fluid moving up the side corrugations starts from the bottom of tray 76 before moving up along the side corrugations 100a. Anaerobic conditions are established and maintained because all material, in order to eventually exit tray 76, must pass through a carbon source then pass to the bottom of the tray, and under the bottom edge of fluid flow plate 116 before moving up the side corrugations 100a to eventually exit the tray 76 just below the top of the sides. In this way a specific fluid flow is established. All fluid must pass through the carbon source 22/22a and must move to the bottom of the tray thus establishing and maintaining anaerobic conditions at the bottom of the tray 76. And no fluid empties out of the top of the tray, only out of the open tops of the side corrugations 100a or outflow apertures as described in other embodiments, for example outflow apertures 80a. FIG. 28 simply shows the bottom and a side 84a with bottom corrugations 94c to illustrate the void space 78 formed by the corrugation valleys of the sides and bottom of tray 76.

In addition, the fluid retaining device/cell/tray can be made of any size, width, length, and depth depending on the load of contaminated water that will be passing therethrough and the amounts and types of contaminants to be removed. In order for the anaerobic processes to occur the fluid must remain in the device for a sufficient amount of time, often between about 8 and 48 hours for example for septic waste. But, other types of waste and greater or lesser amounts of contaminants can require shorter or longer periods of anaerobic exposure. Generally, the longer the contaminated water stays under the anaerobic processing conditions, the better, more complete the de-contamination is. Thus the dimensions of the device as well as the various fluid flow features used therein, such as the aforementioned corrugations, bumpers, protrusions and the like will depend on the types and amounts of contaminants being processed. In any case, contaminated fluid must remain under anaerobic conditions long enough to remove the contaminants. For example in the data shown in FIGS. 29 and 30, by the time the fluid exits the anaerobic conditions essentially all of the contaminants have been removed. Further aerobic processing simply aids in dispersal of gasses and water and allows any further de-contamination to occur.

Thus, it can be seen that there can be almost endless variations of location and layout of the method, apparatus and system of the present invention including: the number and layout of leaching systems; the location and layout of drainage/treatment conduit 20; the layout, positioning and composition of both the porous drainage material 18, 26, and/or 68 and the layout, positioning and composition of carbon source 22 and/or 22A, and other waste processing treatments sucha as microbes etc.; and/or the second aeration and venting of the system. In addition, the leaching system(s) can be enclosed or open to the ground below, can be vented, can be drained into the soil or can be drained into conduit for release into the ground elsewhere or into a collection device for further use. Also, an additional de-nitrification system or structure can be used, in various forms and ways, as described in FIGS. 15-28. The system of the present invention includes a carbon source or sources through which leachate flows as part of the de-nitrification and de-contamination functions of the invention. The conditions within the carbon source(s) can be aerobic or anaerobic initially, but can become and remain anaerobic. The carbon source(s) can be formed into mat or other solid type structures(s) within which anaerobic conditions are created and maintained until leachate exits the carbon source(s). In addition, as shown in FIGS. 16-28, there can be a second, additional or alternative de-nitrification structure or system beyond a carbon source and/or sump system, in the form of a tray structure. The tray structure used, which can contain a carbon source within the tray, can have the carbon source present just prior to it in the flow of the system, or can even be formed from a carbon source-containing material as shown in FIG. 15. As noted, there may or may not be a second conduit system, depending on the local conditions and the results required, as long as second aerobic conditions can again be provided after the anaerobic treatment conditions.

To further aid the function of the system, various chemicals, treatments, microbes, bacteria and the like can be added to the system at any location or point in the process, for example to enhance performance of the leaching system treating the waste before it enters the carbon source. In addition, a multi-layer material, such as the Multi-Layer Material for Processing Septic Effluent And Waste Water and Method of Using the Same, as described in Applicant's U.S. Pat. No. 5,954,451 which is incorporated by reference herein in its entirety, can be used around drainage/treatment conduit 20 to enhance the breakdown of waste materials passing through conduit 20.

As noted above, the invention can be designed with two separate leaching systems and a pump or gravity feed to transfer material from the first to the second leaching system, or a single leaching system can be used. In addition, the system, whether using one or two leaching systems, can be located on flat ground or formed into the side to a hill to take advantage of the slope of the hill. In addition, in systems with sump or pump systems, anaerobic conditions do not necessarily have to be created in the carbon source. They can be created in a sump system or in a tray system. With single leaching systems of the present invention, it is more necessary that the carbon source create the anaerobic conditions by having the leachate pass slowly enough through the carbon source to create anaerobic conditions. Thus, the system can be made anaerobic at any point; in the carbon source, or after the pick up of carbon. Bacteria and chemicals will react as soon as the carbon is picked up, whether under aerobic or anaerobic conditions. The alternating aerobic, anaerobic, and again aerobic conditions more completely remove nitrogen and other contaminants from organic waste.

In yet another embodiment, if space for a leach field is a concern, a multi-level leaching system can be used. For example, in the embodiments shown in the Figures, all of treatment/drainage conduit 20 is shown in a roughly horizontal arrangement with the conduit members lying basically next to each other, generally parallel to the ground surface, although they do not necessarily have to follow the slope of a hill. It is also possible, as described in Applicant's U.S. Pat. No. 6,290,429 for a Multi-Level Leaching System, which is incorporated by reference herein in its entirety, to locate drainage/treatment conduit in a vertical arrangement with each drainage/conduit member located vertically below the previous member, in an arrangement generally perpendicular to the ground surface. Such a vertically-oriented multi-level system can be used in the present invention whether one or more leaching systems is used, and can be used for either the first, second, or both leaching systems if two leaching systems are used.

In other embodiments, the present invention can be used in combination with Applicant's septic tank maze apparatus as described in U.S. Pat. No. 5,429,752 which is incorporated by reference herein in its entirety, or in conventional pipe and stone systems, conventional chambered systems, pipe systems including Enviro-Septic®, SB2®, Geo-Flow® systems and the like, or with ELJEN INDRAIN® systems. In addition the de-nitrification tray system, or part, of the invention can be used separately from other features of the invention, and/or in combination with other types of known leaching and/or treatment systems such as those listed above.

Particular aspects of the invention include treatment of septic waste in combination with use of a carbon source and alternating aerobic, anaerobic, and aerobic conditions. Some digestion/breakdown processes occur in the first aerobic phase, additional anaerobic and carbon reactions occur in the anaerobic phase. When the waste/carbon mixture leaves the carbon source and the anaerobic conditions and mixes with ambient air (whether in soil, porous drainage material, or using venting apparatus), carbon and bacteria can again react aerobically to remove the final contaminants present in the waste/carbon mixture or leachate.

The waste/carbon mixture exiting the septic tank, as is the case with all leachate treated in a conventional septic system, contains high levels of nitrogen containing compounds such as nitrates and nitrites. To date however, attempts to remove the nitrates and nitrites have been largely unsuccessful. Once carbon is added however, in the present invention, and the mixture of leachate, carbon, bacteria/microbes and the like is held under anaerobic conditions and then delivered again to aerobic conditions, the bacteria/microbes and carbon react in two different types of reactions with the nitrogen-containing and other compounds and contaminants to convert them from unwanted, toxic and/or otherwise undesirable or harmful compounds into generally harmless compounds such as nitrogen gas, water, and carbon dioxide which can safely be released into the air or the ground. Although nitrogen compounds have been the focus of the examples presented herein, the addition of a carbon source to leachate, in combination with alternating aerobic, anaerobic and aerobic conditions also allows the bacteria/microbes and chemicals in the septic system to react with, and more fully process, the leachate in general, including processing non-nitrogen compounds that conventional systems can not process as fully. Thus, the present invention produces a very clean final effluent from which almost all nitrates, nitrites and other harmful compounds have been removed due to the alternating aerobic, anaerobic and aerobic conditions and the addition of carbon. Applicant's invention purifies and cleans leachate to an extent not possible with known septic/waste systems. As noted above, the final effluent from Applicant's systems can be used for irrigation and even further purification such as chlorination for using it eventually as drinking water.

For example, FIGS. 29 and 30 are tables presenting some experimental data showing removal of various compounds from waste mixtures using various embodiments of the invention. FIG. 29 shows, in the 9th and 10th rows of compounds tested, 39 mg/L of NO3 and 39 mg/L NO2-NO3 mixture were run through various embodiments of the invention shown in the column headings across the top of the table. It can be seen that, with embodiment DN2, as little as 3.1 mg/L of the initial 39 mg/L of the nitrogen compounds remain. The standard for these compounds for drinking water is 10 mg/L. Similarly, FIG. 30 shows that when 26 mg/L of NO3 and 26 mg/L NO2-NO3 mixture were run through various embodiments of the invention, as little as 0.3 mg/L of these compounds remain using embodiment DN2. In other examples in FIG. 29 it can be seen that when 1.1 mg P/L was added, all embodiments of the invention reduced the phosphorus to less than 0.3 mg P/L. Thus, it can be seen that the aerobic, anaerobic with carbon, aerobic methods and apparatus of the invention, particularly the various embodiments of the anaerobic tray apparatus, remove essentially all of the nitrogen compounds that current septic systems can not.

Additionally, the present invention provides another advantage that improves the de-nitrification and de-contamination processes, and which conventional systems, even those that attempt de-nitrification can not do well. The structure, layout and construction of the system of the present invention as a whole provides a temperature-stable environment for the nitrogen-digesting and contaminant-digesting microbes. Generally the types of microbes that function as part of the de-nitrification process do not thrive in environments in which there are large temperature swings. For example most septic tanks, and the leaching systems directly at the exit of septic tanks experience large temperature swings depending on whether cold or hot water is entering the system, such as from cool water used to flush toilets versus very hot water used in washing machines and dishwashers. Therefore, most nitrogen-digesting microbes do not thrive or even survive in most septic systems. However, due to the structure of the present invention the nitrogen-digestion process takes place at essentially constant temperatures. The de-nitrification and decontamination processes not only occur down below grade where surface temperatures do not vary a great deal, but the leachate passes through the various layers of drainage materials such as sand, gravel, soil mix and the like before entering the de-nitrification/decontamination structure(s)—the various carbon and tray structures. Therefore, the leachate has essentially reached the temperature of the surrounding soil (which stays fairly constant in cold or hot climates, with only about a 5-10 degree variation year 'round, beyond a few feet below the surface) by the time it enters the anaerobic de-nitrification/decontamination portion(s) of the overall system.

Thus, the de-nitrification/decontamination processes of the present invention occur at fairly constant temperatures regardless of season, geographic location of the system, or temperature of the liquids entering the system. Therefore, because more microbes can survive and act at the relatively constant temperatures of Applicant's system(s), Applicant's de-nitrification/decontamination process is more much more efficient than that of most systems. In fact, most known systems, even those that attempt to de-nitrify, cannot remove nitrogen-containing compounds to any significant extent, whereas the present invention, as shown by the examples of FIGS. 29 and 30, removes essentially all of the nitrogen-containing compounds to produce a very clean effluent. In addition, as can be seen in FIGS. 29 and 30 Applicant's invention removes essentially all of many other compounds and materials as well, including *E. coli* and phosphorus.

Therefore, it can be seen that the embodiments described above illustrate but a few examples of the variations in design and location for use of the methods, apparatuses and systems of the present invention. In addition, variations in the one or more conduit systems may be used. For example while a preferred treatment/drainage conduit is Applicant's patented conduit, as found in U.S. Pat. No. 6,461,078, which is incorporated by reference herein in its entirety, it is possible to use other drainage/treatment conduit in a leaching system, such as, for example Applicant's conduit described in U.S. Pat. No. 5,606,786 which is incorporated by reference herein in its entirety. While Applicant uses Applicant's own patented conduit in the examples presented herein, the invention is not limited to use with Applicant's conduits. Various drainage/treatment conduit can be used with the present invention.

The methods, apparatuses and systems for removal of nitrogen-containing compounds and other contaminants from leaching systems, and many of the attendant advantages are understood from the foregoing description. As noted, various and several changes may be made in the form, construction and arrangement of the parts thereof without departing from the spirit and scope of the invention or sacrificing its material advantages, the forms hereinbefore described being merely exemplary embodiments.

What is claimed is:

1. A method for removing contaminants from water comprising:
    introducing waste water into a first aerobic waste processing system;
    passing the waste water through a bed of porous material;
    passing said waste water from said bed of porous material over a solid carbon source;
    retaining said waste water in an anaerobic condition in contact with said solid carbon source;
    anaerobically converting nitrate and nitrite to nitrogen gas at said carbon source to reduce nitrate/nitrite concentration by greater than 50%; and
    passing said waste water from said carbon source into the ground or into surface water.

2. The method of claim 1 further comprising venting nitrogen gas to the atmosphere.

3. The method of claim 1 further comprising reducing the phosphorus content of said waste water from greater than 1 mg/L to less than 1 mg/L.

4. The method of claim 1 comprising leaching the waste water through the carbon source directly to the ground.

5. The method of claim 1 further comprising removing a majority of any ammonia and organic nitrogen compounds in the first aerobic waste processing system.

6. The method of claim 1 comprising maintaining an anaerobic environment at the carbon source.

7. The method of claim 1 wherein the waste water comprises a septic tank effluent.

8. The method of claim 1 wherein the waste water comprises household waste water.

9. The method of claim 1 further comprising passing the waste water from the carbon source to a second aerobic processing system.

10. The method of claim 1 wherein the anaerobic conversion step is performed in a leach field downstream of a septic tank.

11. The method of claim 1 wherein said carbon source is located above the water table.

12. The method of claim 1 wherein said nitrate/nitrite concentration is reduced to less than 10 mg/L.

* * * * *